United States Patent
Yang et al.

(10) Patent No.: US 10,459,533 B2
(45) Date of Patent: Oct. 29, 2019

(54) INFORMATION PROCESSING METHOD AND ELECTRONIC DEVICE

(71) Applicants: BEIJING LENOVO SOFTWARE LTD., Beijing (CN); LENOVO (BEIJING) LIMITED, Beijing (CN)

(72) Inventors: Yinsi Yang, Beijing (CN); Zhepeng Wang, Beijing (CN); Xiaobing Guo, Beijing (CN); Xiaoping Zhang, Beijing (CN)

(73) Assignees: BEIJING LENOVO SOFTWARE LTD., Beijing (CN); LENOVO (BEIJING) LIMITED, Beijing (CN)

(*) Notice: Subject to any disclaimer, the term of this patent is extended or adjusted under 35 U.S.C. 154(b) by 419 days.

(21) Appl. No.: 14/723,871

(22) Filed: May 28, 2015

(65) Prior Publication Data
US 2016/0188003 A1    Jun. 30, 2016

(30) Foreign Application Priority Data
Dec. 26, 2014   (CN) .......................... 2014 1 0829771

(51) Int. Cl.
*G06F 3/0346* (2013.01)
*G09G 5/08* (2006.01)

(52) U.S. Cl.
CPC .............. *G06F 3/0346* (2013.01); *G09G 5/08* (2013.01); *G09G 2340/0464* (2013.01); *G09G 2354/00* (2013.01)

(58) Field of Classification Search
CPC ................................ G06F 3/0346; G09G 5/18
USPC .......................................................... 345/158
See application file for complete search history.

(56) References Cited

U.S. PATENT DOCUMENTS

| 2012/0062457 | A1* | 3/2012 | Lee ........................ G06F 3/0346 345/157 |
| 2012/0194427 | A1* | 8/2012 | Lee ........................ G06F 3/0346 345/157 |
| 2013/0314396 | A1 | 11/2013 | Kang et al. |
| 2015/0177855 | A1* | 6/2015 | Grenet .................. G06F 3/0383 345/158 |

(Continued)

*Primary Examiner* — Jennifer Mehmood
*Assistant Examiner* — Ngan T Pham Lu
(74) *Attorney, Agent, or Firm* — Scully Scott Murphy & Presser, P.C.

(57) ABSTRACT

The present disclosure provides an information processing method and electronic device. The method comprises: displaying an indicator at a first location on a display area of a first electronic device at a first timing; acquiring a first operation data corresponding to a second timing which is later than the first timing, and updating to display the indicator at a second location on the display area different from the first location; acquiring a second operation data corresponding to a third timing which is later than the second timing when the second location is located on a border of the display area; and performing a predetermined process such that the indicator is displayed at a third location on the display area at a fourth timing when the pointing of the second electronic device re-enters the display area which is later than the third timing, the third location matching with the pointing at the fourth timing. With the present disclosure, the problem of mismatch between the pointing of the second electronic device and the location of the indicator on the display area can be addressed.

11 Claims, 20 Drawing Sheets

(56) References Cited

U.S. PATENT DOCUMENTS

2016/0370883 A1* 12/2016 Narita ..................... G06F 3/042

* cited by examiner

INFORMATION PROCESSING METHOD AND ELECTRONIC DEVICE

CROSS-REFERENCE TO RELATED APPLICATION(S)

This application claims priority to the Chinese Patent Application No. 201410829771.1, filed on Dec. 26, 2014, entitled "INFORMATION PROCESSING METHOD AND ELECTRONIC DEVICE", the disclosure of which is incorporated herein by reference in its entirety.

TECHNICAL FIELD

The present application relates to technology of information processing, and in particular, to an information processing method and an electronic device.

BACKGROUND

Collaborative applications of air mouse in combination with other electronic devices, such as TV, projector, notebook, etc., are increasingly popular. For applications of a large screen, such as TV or projector, an air mouse (such as, a remote control, a smart phone) is always needed. However, such an air mouse cannot meet the practical requirements for usage so far. For example, when a pointing by an air mouse goes beyond a border of a display area by a certain distance, the indicator on the display area corresponding to the air mouse is located on the border of the display area at that time. If the air mouse moves in a direction to the display area, based on an existing responding technology of air mouse, the indicator on the display area corresponding to the air mouse will move in real time, while the pointing by the air mouse has not entered the display area yet. In other words, the pointing by the air mouse does not match with the indicator of the air mouse, thereby resulting in a great inconvenience for practical usage.

SUMMARY

An embodiment of the present disclosure provides an information processing method and an electronic device which enables an air mouse to match its pointing with its corresponding indicator on a display area of the electronic device.

The technical solution of the embodiment of the present disclosure can be achieved as follows.

An embodiment of the present disclosure provides an information processing method, comprising:

displaying an indicator at a first location on a display area of a first electronic device at a first timing, the first location matching with a pointing a second electronic device on the display area of the first electronic device;

acquiring a first operation data corresponding to a second timing which is later than the first timing, and updating to display the indicator at a second location on the display area different from the first location in response to the first operation data, the second location matching with the pointing at the second timing;

acquiring a second operation data corresponding to a third timing which is later than the second timing when the second location is located on a border of the display area, wherein the second operation data corresponding to the third timing characterizes an change of the pointing which goes beyond the border of the display area; and performing a predetermined process such that the indicator is displayed at a third location on the display area at a fourth timing when the pointing re-enters the display area which is later than the third timing, the third location matching with the pointing at the fourth timing.

An embodiment of the present disclosure provides an information processing method in a second electronic device, the method comprising:

collecting a first operation data corresponding to a second timing which is later than a first timing and transmitting the first operation data to a first electronic device, the first operation data being used to characterize a pointing the second electronic device on the display area of the first electronic device at the second timing, the first operation data being used for the first electronic device to update to display an indicator at a second location on the display area, to replace the displaying of the indicator at a first location, the first location matching with the pointing at the first timing;

performing a predetermined process when a second operation data collected at a third timing which is later than the second timing characterizes that the pointing goes beyond a border of the display area, such that the first electronic device displays the indicator at a third location on the display area at a fourth timing when the pointing is located on the display area again, the third location matching with the pointing at the fourth timing.

An embodiment of the present disclosure provides a first electronic device, comprising:

a display control unit configured to display an indicator at a first location on a display area of the first electronic device at a first timing, the first location matching with a pointing of a second electronic device on the display area of the first electronic device;

an acquiring unit configured to acquire a first operation data corresponding to a second timing which is later than the first timing;

the display control unit is further configured to update to display the indicator at a second location on the display area different from the first location in response to the first operation data, the second location matching with the pointing at the second timing;

the acquiring unit is further configured to acquire a second operation data corresponding to a third timing which is later than the second timing when the second location is located on a border of the display area, wherein the second operation data corresponding to the third timing characterizes an change of the pointing which goes beyond the border of the display area; and a first predetermined processing unit configured to perform a predetermined process such that the indicator is displayed at a third location on the display area at a fourth timing when the pointing re-enters the display area which is later than the third timing, the third location matching with the pointing at the fourth timing.

An embodiment of the present disclosure provides a second electronic device, comprising:

a collecting unit configured to collect a first operation data corresponding to a second timing which is later than a first timing, the first operation data being used to characterize a pointing of the second electronic device on the display area of the first electronic device at the second timing, the first operation data being transmitted to the first electronic device and used for the first electronic device to update to display an indicator at a second location on the display area, to replace the displaying of the indicator at a first location, the first location being matched with the pointing at the first timing;

a second predetermined processing unit configured to perform a predetermined process when a second operation data collected at a third timing which is later than the second timing characterizes that the pointing goes beyond the border of the display area, such that the first electronic device displays the indicator at a third location on the display area at a fourth timing when the pointing is located on the display area again, the third location being matched with the pointing at the fourth timing.

In the embodiments of the present disclosure, when the pointing of the second electronic device goes beyond the display area, a predetermined process is performed. For example, when the pointing of the second electronic device (corresponding to a control mouse) is beyond the display area and moves towards the display area, the location of the indicator on the display area is not changed immediately. When the pointing of the second electronic device re-enters the borders of the display area, a corresponding location is determined on the display area based on the pointing of the second electronic device and the indicator is updated to be displayed at the determined location, thereby avoiding the problem of mismatch between the pointing of the second electronic device and the location of the indicator on the display area and improving the accuracy of the controlling by the second electronic device.

DETAILED DESCRIPTION

A detailed description of the present disclosure will be given with reference to the drawings and specific embodiments.

First Embodiment

The present embodiment provides an information processing method in a first electronic device. In practical, the first electronic device may be a television, a projector, or any other display device. The first electronic device supports displaying of an indicator (for example, a conventional arrow) at a location within its own display area, the location matching with a pointing of a second electronic device on the display area, to indicate a location on the display area that can be operated by means of the pointing of the second electronic device (which may be a remote control or a smart phone) on the display area (hereinafter, referred as "the pointing"). In this way, the user is enabled to use the second electronic device to control the first electronic device for achieving web browsing, multimedia file playback, gaming, or the like.

The information processing method of the present embodiment is described in connection with the implementation of the scenario shown by FIG. 1a. A first electronic device (for example, a TV) displays an indicator (for example, an arrow) at a location (Location 1) on the display area which matches with a pointing of a second electronic device (for example, a remote control) on the display area of the first electronic device (hereinafter, referred as "the pointing of the second electronic device"), to indicate the operation location of the second electronic device on the display area. When the pointing of the second electronic device changes to Location 2, the indicator is updated to be displayed at Location 2. When the pointing of the second electronic device changes to Location 3, the indicator is updated to be displayed at Location 3. When the pointing of the second electronic device moves out of a border of the display area from Location 3, the indicator is still displayed at Location 3. When the pointing of the second electronic device changes to Location 4 and moves toward to the display area from Location 4, the location of the indicator on the display area is not changed immediately. When the pointing of the second electronic device changes to Location 3 and re-enters the border of the display area from Location 3, a new location (for example, Location 2 shown in FIG. 1a) is determined on the display area based on the pointing of the second electronic device and the indicator is updated to be displayed at Location 2. Thereby, the problem of mismatch between the pointing of the second electronic device and the location of the indicator on the display area is avoided and the accuracy of the controlling by the second electronic device is improved.

Figure 1A:
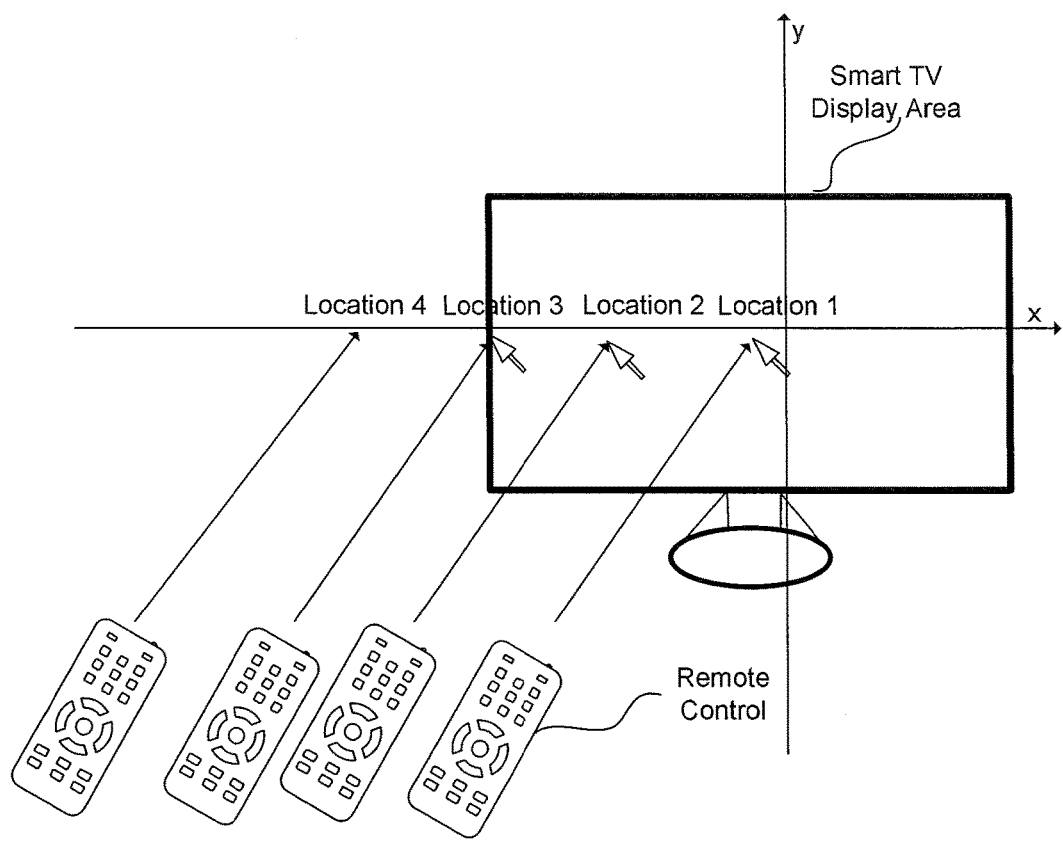
FIG. 1a is a first scenario diagram showing an information processing method according to a first embodiment of the present disclosure.
Figure 1B:
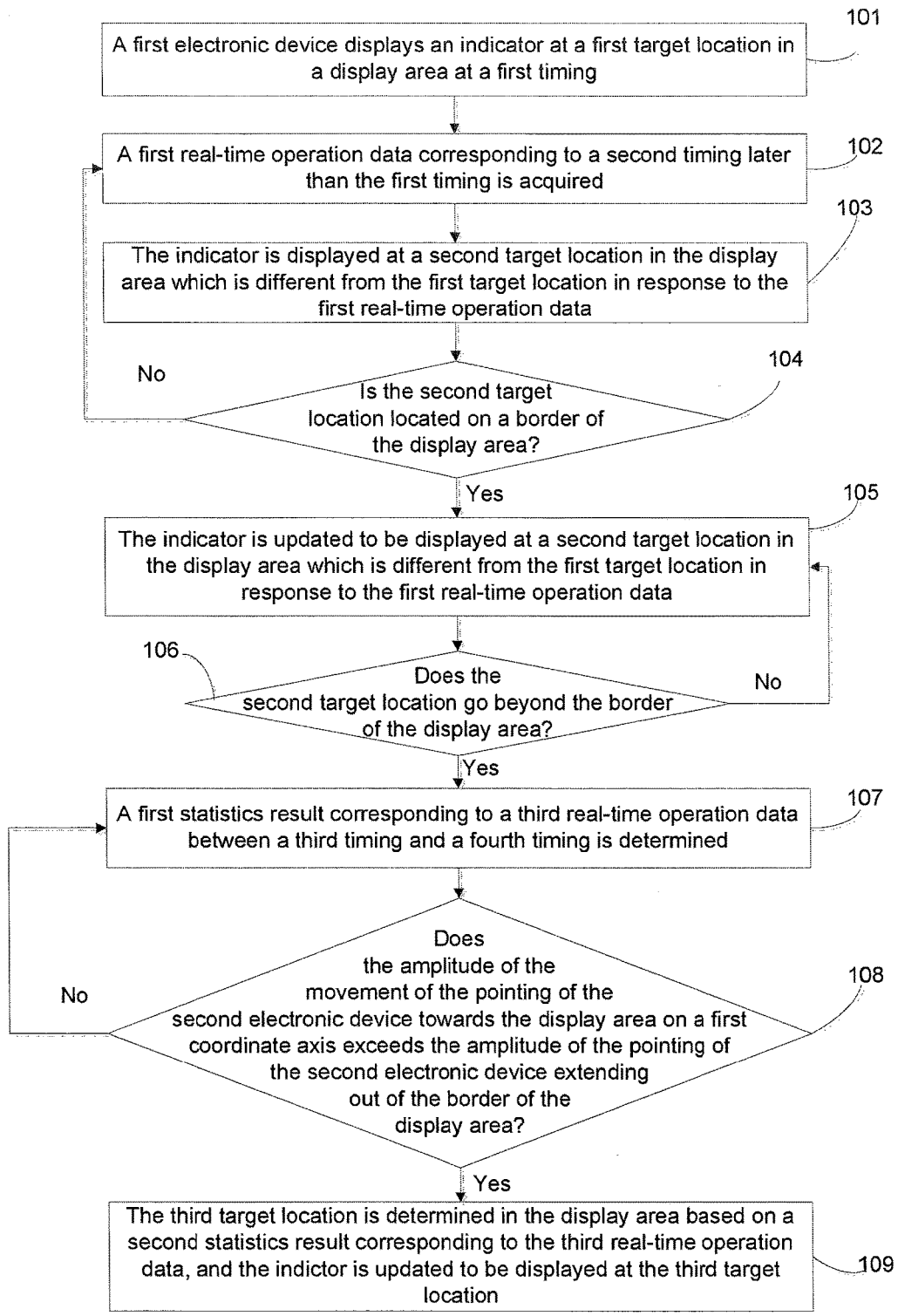
FIG. 1b is a flow chart showing the information processing method according to the first embodiment of the present disclosure.

As shown in FIG. 1b, the information processing method of the present embodiment comprises steps as follows.

Step 101: a first electronic device displays an indicator at a first target location on a display area at a first timing.

In the scenario shown by FIG. 1a, the first target location corresponds to Location 1, and the first target location matches with a pointing of a second electronic device on the display area of the first electronic device at the first timing.

Step 102: a first real-time operation data corresponding to a second timing which is later than the first timing is acquired.

Real-time operation data corresponding to different timings can be acquired by the first electronic device collecting the location/posture of the second electronic device. For example, the first electronic device may collect data by at least one of:

Image Capture (3D camera or array of cameras), where the location and/or posture of the second electronic device may be determined based on the data collected by analyzing captured images; and Sound Wave Detection, where the location and/or posture of the second electronic device may be determined based on the data collected by analyzing sound detected according to the echolocation principle.

Real-time operation data corresponding to different timings may also be collected and transmitted to the first electronic device by the second electronic device. The second electronic device may use a sensor, such as a gyro, to collect real-time operation data characterizing the location/posture of the second electronic device.

The sample period of the real-time operation data may depend on the requirement on the operation data in terms of real time in actual applications. The higher the requirement of real time is, the shorter the sample period is.

Step 103: the indicator is updated to be displayed at a second target location on the display area different from the first target location, in response to the first real-time operation data.

In the scenario shown by FIG. 1a, the second target location corresponds to Location 2, and the second target location matches with the pointing of the second electronic device at the second timing. The first real-time operation data corresponding to the second timing characterizes a change of the pointing of the second electronic device which does not go beyond the border of the display area. The second target location may be determined by: analyzing the first real-time operation data to acquire the changed amplitude and direction of the pointing of the second electronic device at the second timing; determining, with reference to the first target location, the second target location on the display area corresponding to the changed amplitude and direction of the pointing of the second electronic device; wherein the amplitude here may have a form of distance to characterize the changed distance of the pointing of the second electronic device during each sample period; or wherein the amplitude may have a form of counting to characterize the number of changes of the pointing of the second electronic device with a preset distance step.

When the amplitude has the form of distance, in a plane coordinate system shown in FIG. 1a which is established based on the plane in which the display area is located, the second target location may be determined on the display area based on the changed distance and direction of the pointing of the second electronic device at the second timing and based on the first target location, to update and display the indicator at the second target location.

When the amplitude has the form of counting, in a plane coordinate system shown in FIG. 1a which is established based on the plane in which the display area is located, the second target location may be determined on the display area based on the changed distance (here, the distance is a product of the count and the preset distance step) and direction of the pointing of the second electronic device at the second timing and based on the first target location, to update and display the indicator at the second target location.

It is to be noted that step 103 may be performed for multiple times before the pointing of the second electronic device goes beyond the border of the display area. In other words, the second target location may be re-determined for multiple times and the indicators may be displayed at the re-determined second target locations for multiple times, to respond to the operations of location control which are performed by the user in the display area by changing the pointing of the second electronic device.

Step 104: it is determined whether the second target location is located on the border of the display area, and if yes, step 105 is performed; otherwise it turns to step 102.

The second target location corresponds to Location 3 shown in FIG. 1a when it is located on the border of the display area. "No" at step 104 characterizes that the pointing of the second electronic device does not go beyond the display area, and it turns to step 102. In response to the operation of changing the pointing of the second electronic device by the user, the indicator is displayed at the location on the display area corresponding to the pointing of the second electronic device (corresponding to the second target location). If the result of step 104 is Yes, which means that the pointing of the second electronic device may go beyond the border of display area after the second timing, step 105 is performed.

Step 105: a second real-time operation data corresponding to a third timing which is later than the second timing is acquired.

Step 106: Whether the pointing of the second electronic device goes beyond the border of the display area is determined based on the second real-time operation data. If yes, then step 107 is performed; otherwise, it turns to step 105.

Step 106 is a process performed when the pointing of the second electronic device reaches the border of the display area, for determining whether the pointing of the second electronic device goes beyond the border of the display area or not. The first electronic device analyzes the real-time operation data at each timing (the third timing) corresponding to each sample period after the second timing, to acquire the information of changed amplitude and direction of the pointing of the second electronic device. In a plane coordinate system shown in FIG. 1a which is established based on the plane in which the display area is located, a location pointed by the pointing of the second electronic device at the third timing (indicated by the coordinates in the plane coordinate system) is acquired based on the changed amplitude and direction and based on the second target location (indicated by the coordinates in the plane coordinate system). Whether this location goes beyond the coordinate range of the display area in the plane coordinate system is determined. If yes, then it is determined that the pointing of the second electronic device goes beyond the border of the display area at the third timing; otherwise, it is determined that the pointing of the second electronic device does not go beyond the border of the display area at the third timing.

If it is determined that the pointing of the second electronic device does not go beyond the border of the display area (the pointing of the second electronic device may still be located on the border of the display area, or re-enter the display area), it turns to step 105. When the timing corresponding to the next sample period (corresponding to the second timing) comes, the determination of whether the pointing of the second electronic device goes beyond the border of the display area based on the real-time operation data at the current sample period timing is continued.

Step 107: a first statistics result corresponding to a third real-time operation data between the third timing and a fourth timing (which is a timing later than the third timing) is determined.

The timing corresponding to each sample period of the real-time operation data after the third timing is a fourth timing. In other words, in step 107, for any timing corresponding to a sample period of the real-time operation data after the third timing, a corresponding first statistics result is determined.

The first statistics result characterizes the amplitude of the movement of the pointing of the second electronic device towards the display area based on a first coordinate axis or the amplitude of the movement of the pointing of the second electronic device exceeding the border of the display area based on the first coordinate axis (the first coordinate axis is a coordinate axis in the plane coordinate system which is established based on the plane in which the display area is located). Further, the first coordinate axis is a coordinate axis on which the extending of the pointing of the second electronic device out of the display area is based. For example, in the scenario shown in FIG. 1*a*, when the pointing of the second electronic device goes beyond the border of the display area along Location 1, Location 2, and Location 3 and reaches Location 4, the pointing of the second electronic device changes in the negative direction of X axis, and therefore the X axis is the first coordinate axis.

Based on different forms of the real-time operation data, the amplitude may be characterized by the distance of movement of the pointing of the second electronic device or the number of changes of the pointing of the second electronic device (representing the number of changes of the pointing of the second electronic device with a preset distance step).

Step 108: whether the amplitude of the movement of the pointing of the second electronic device towards the display area on the first coordinate axis exceeds the amplitude of the pointing of the second electronic device extending out of the border of the display area on the first coordinate axis is determined based on the first statistics result. If yes, step 109 is performed; otherwise, it turns to step 107.

When the amplitude of the movement of the pointing of the second electronic device towards the display area on the first coordinate axis exceeds the amplitude of the pointing of the second electronic device extending out of the border of the display area on the first coordinate axis, it means that the pointing of the second electronic device re-enters the display area along the direction of the first coordinate axis (the X axis) and the coordinate of the location where the second electronic device re-enters the display area (i.e., the third target location) on the first coordinate axis is the same as the coordinate of the second target location on the first coordinate axis. This corresponds to a scenario as follows: the pointing of the second electronic device goes beyond the border of the display area from a location at a side of the display area (corresponding to the second target location), and the second electronic device re-enters the display area from this side later (in practical, when the pointing of the second electronic device enters the display area from a side opposite to this side, the case where the coordinate of the third target location on the first coordinate axis is the same as the coordinate of the second target location on the first coordinate axis will also occur, and the description thereof is omitted from the present embodiment).

It is to be noted that the "exceeding" here means that the amplitude of the movement of the pointing of the second electronic device towards the display area on the first coordinate axis is determined, for the first time, to exceed the amplitude of the pointing of the second electronic device extending out of the border of the display area on the first coordinate axis based on the first statistics result corresponding to the third real-time operation data between the third timing and the fourth timing (which is a timing later than the third timing). In other words, at the timing corresponding to the previous sample period right before the third timing, the pointing of the second electronic device has not enter the display area yet.

For example, as shown in FIG. 1*a*, when the pointing of the second electronic device goes beyond border of the display area from Location 3 at the third timing and moves to Location 4 and then enters the display area from Location 3 at the fourth timing, the first statistics result of the real-time operation data between the third timing and the fourth timing characterizes that the amplitude of the movement of the pointing of the second electronic device towards the display area on the first coordinate axis (the X axis) exceeds the amplitude of the pointing of the second electronic device extending out of the display area on the first coordinate axis between the third timing and the fourth timing. Therefore, the pointing of the second electronic device re-enters the display area at the fourth timing, and the X axis coordinate of the location where the pointing of the second electronic device re-enters the display area (i.e., the third target location) is identical to the X axis coordinate of the second target location.

Figure 1C:
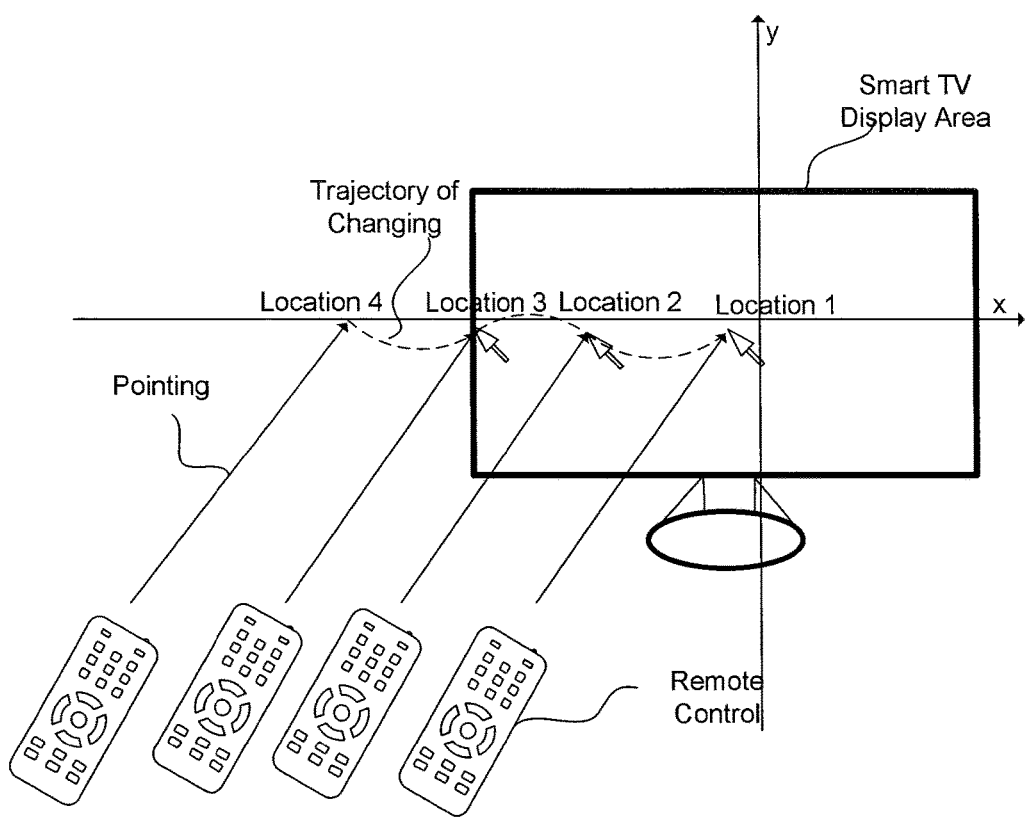
FIG. 1c is a second scenario diagram showing the information processing method according to the first embodiment of the present disclosure.

In practical, the pointing of the second electronic device will usually not change along a trajectory of straight line. One example is shown in FIG. 1*c*. The pointing of the second electronic device moves along a movement trajectory from Location 1 to Location 2, and goes beyond the border of the display area from Location 3 at the third timing and reaches Location 4, and returns to Location 3 from Location 4, and enters the display area from Location 3 at the fourth timing. The first statistics result of the real-time operation data between the third timing and the fourth timing still characterizes that the amplitude of the movement of the pointing of the second electronic device towards the display area on the first coordinate axis exceeds the amplitude of the pointing of the second electronic device extending out of the border of the display area. Therefore, the pointing of the second electronic device re-enters the display area at the fourth timing and the X axis coordinate of the location where the pointing of the second electronic device re-enters the display area (i.e., the third target location) is identical to the X axis coordinate of the second target location.

Step 109: the third target location is determined on the display area based on the second statistics result corresponding to the third real-time operation data, and the indicator is updated to be displayed at the third target location.

In step 108, it is already determined that the coordinate of the third target location on the first coordinate axis (corresponding to the X axis in FIG. 1*a*) is same as the coordinate of the second target location on the first coordinate axis. In step 109, the coordinate of the third target location on a second coordinate axis (the second coordinate axis is a coordinate axis other than the first coordinate axis in the plane coordinate system which is established based on the plane where the display area is located) is determined based on the second statistics result, thereby determining the coordinates of the third target location in the plane coordinate system corresponding to the display area plane, and updating to display a third target indicator on the display area based on the coordinates of the third target location.

The second statistics result characterizes the amplitude of changing of the pointing of the second electronic device on the second coordinate axis. The second statistics result characterizes the amplitude of changing of the pointing of the second electronic device on the second coordinate axis between the third timing (the timing when the pointing of the second electronic device goes beyond the display area) and the fourth timing (the timing when the pointing of the second electronic device enters the display area), and it comprises the amplitude of the changing of the pointing of the second electronic device in the positive direction of the second coordinate axis and/or the amplitude of the changing of the pointing of the second electronic device in the negative direction of the second coordinate axis.

When the coordinate of the third target location on the first coordinate axis (corresponding to the X axis in FIG. 1a) is same as the coordinate of the second target location on the first coordinate axis, there are three cases in the comparisons between the amplitude of the pointing of the second electronic device on the positive direction of the second coordinate axis and the amplitude of the pointing of the second electronic device on the negative direction of the second coordinate axis.

1) The scenario is shown in FIG. 1a, where the pointing of the second electronic device goes beyond the display area from Location 3 at the third timing, moves to Location 4 in the direction of the X axis, and enters the display area from Location 3 in the direction of the X axis at the fourth timing. Both of the amplitude of the changing of the pointing of the second electronic device on the positive direction of the second coordinate axis (the Y axis) and the amplitude of the changing of the pointing of the second electronic device on the negative direction of the second coordinate axis are zeros (that is, the pointing of the second electronic device does not change on the Y axis). In step 109, since the first statistics result characterizes that the coordinate of the third target location on the first coordinate axis is same as the coordinate of the second target location on the first coordinate axis, the coordinates of the third target location are same as the coordinates of the second target location (corresponding to Location 3).

Figure 1D:
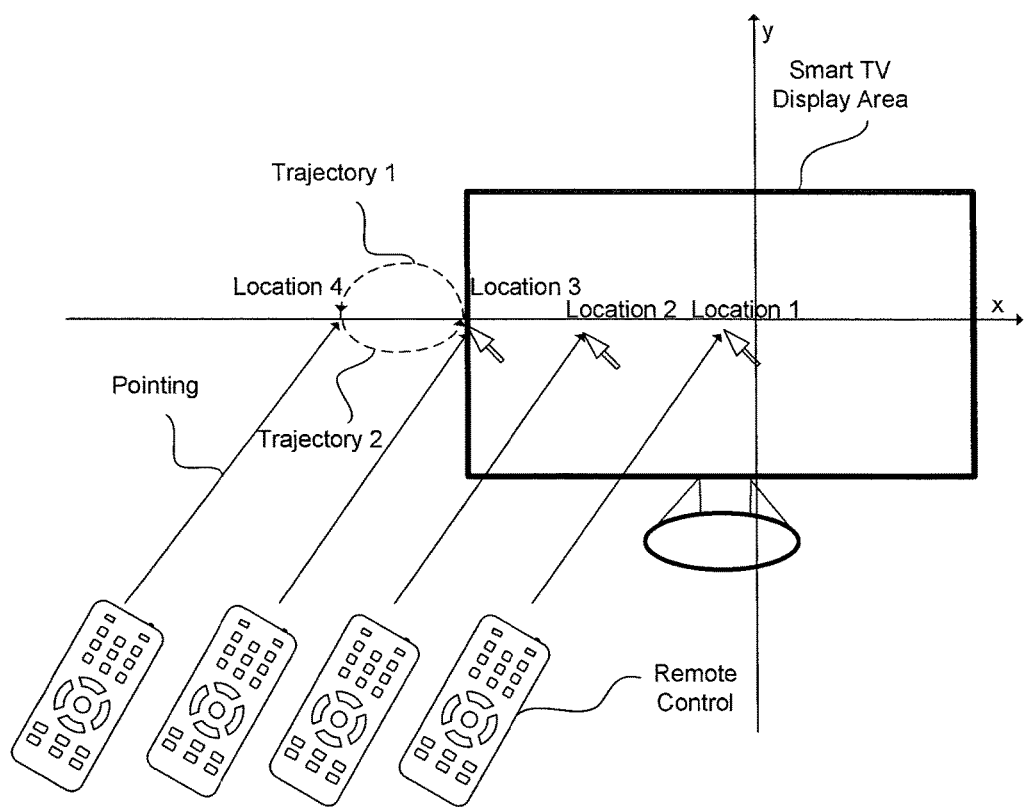
FIG. 1d is a third scenario diagram showing the information processing method according to the first embodiment of the present disclosure.

2) The scenario is shown in FIG. 1d, where the pointing of the second electronic device goes beyond the display area from Location 3 at the third timing, moves to Location 4 along the Trajectory 2, moves to Location 3 along the Trajectory 1, and enters the display area from Location 3 at the fourth timing. The second statistics result characterizes that the amplitude of the changing of the pointing of the second electronic device on the positive direction of the second coordinate axis (the Y axis) and the amplitude of the changing of the pointing of the second electronic device on the negative direction of the second coordinate axis are same. In step 109, since the first statistics result characterizes that the coordinate of the third target location on the first coordinate axis is same as the coordinate of the second target location on the first coordinate axis, the coordinates of the third target location are same as the coordinates of the second target location (corresponding to Location 3).

Figure 1E:
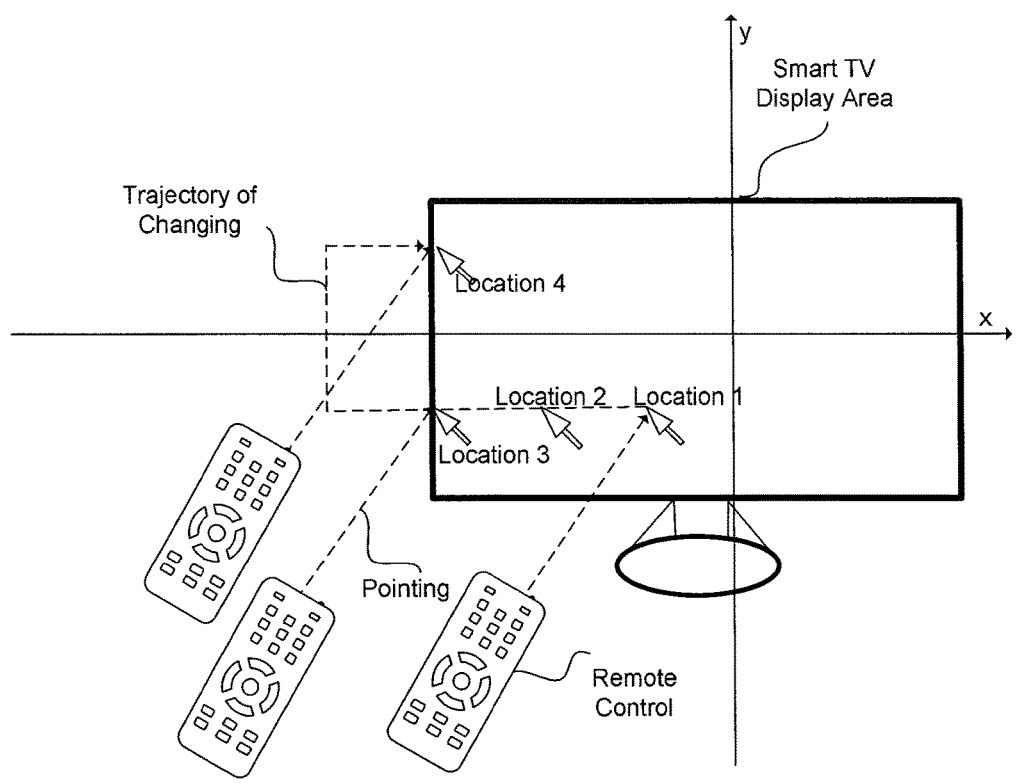
FIG. 1e is the third scenario diagram showing the information processing method according to the first embodiment of the present disclosure.

3) The scenario is shown in FIG. 1e, where the pointing of the second electronic device changes in accordance with the changing trajectory shown in FIG. 1e. It goes beyond the display area from Location 3 at the third timing, and enters the display area from Location 4 at the fourth timing. The second statistics result characterizes that the pointing of the second electronic device changes on the positive direction of the Y axis but not on the negative direction of the Y axis. Therefore, the difference between the amplitude of the changing of the pointing of the second electronic device on the positive direction of the Y axis and the amplitude of the changing on the negative direction of the Y axis (i.e., the amplitude of the changing of the pointing on the positive direction of the Y axis) is used as the amount of the changing of the coordinate of the third target location on the second coordinate axis with respect to the coordinate of the second target location on the second coordinate axis. That is, the second target location is changed by the amplitude corresponding to the above difference on the positive direction of the Y axis, to obtain the third target location (corresponding to Location 4), and the indicator is updated to be displayed at Location 4.

Second Embodiment

The present embodiment provides an information processing method in a first electronic device. In practical, the first electronic device may be a television, a projector, or any other display device. The first electronic device supports displaying of an indicator (for example, a conventional arrow) at a location within its own display area, the location matching with a pointing of a second electronic device on the display area, to indicate a location on the display area that can be operated by means of the pointing of the second electronic device (which may be a remote control or a smart phone) on the display area (hereinafter, referred as "the pointing"). In this way, the user is enabled to use the second electronic device to control the first electronic device for achieving web browsing, multimedia file playback, gaming, or the like.

Figure 2A:
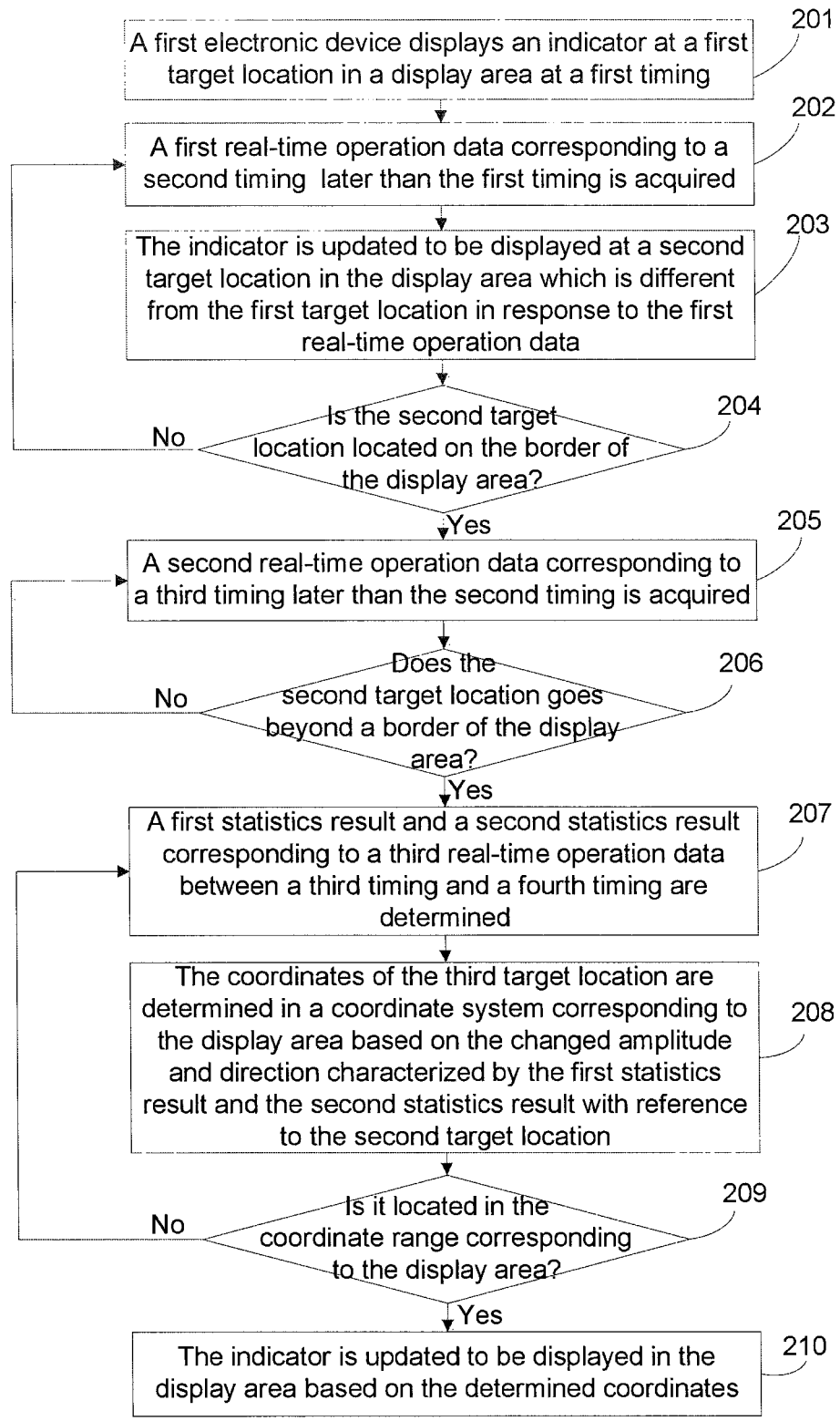
FIG. 2a is a flow chart showing an information processing method according to a second embodiment of the present disclosure.

As shown in FIG. 2a, the information processing method of the present embodiment comprises steps as follows.

Step 201: a first electronic device displays an indicator at a first target location on a display area at a first timing.

The first target location matches with a pointing of a second electronic device on the display area of the first electronic device at the first timing.

Step 202: a first real-time operation data corresponding to a second timing which is later than the first timing is acquired.

Real-time operation data corresponding to different timings can be acquired by the first electronic device collecting the location/posture of the second electronic device. For example, the first electronic device may collect data by at least one of:

Image Capture (3D camera or array of cameras), where the location and/or posture of the second electronic device may be determined based on the data collected by analyzing captured images; and Sound Wave Detection, where the location and/or posture of the second electronic device may be determined based on the data collected by analyzing sound detected according to the echolocation principle;

Real-time operation data corresponding to different timings may also be collected and transmitted to the first electronic device by the second electronic device. The second electronic device may use a sensor, such as a gyro, to collect real-time operation data characterizing the location/posture of the second electronic device.

The sample period of the real-time operation data may depend on the requirement on the operation data in terms of real time in actual applications. The higher the requirement of real time is, the shorter the sample period is.

Step 203: the indicator is updated to be displayed at a second target location on the display area different from the first target location, in response to the first real-time operation data.

The second target location may be determined by: analyzing the first real-time operation data to acquire the changed amplitude and direction of the pointing of the second electronic device at the second timing; determining, with reference to the first target location, the coordinates corresponding to the changed amplitude and direction of the pointing of the second electronic device (the second target location) in a plane coordinate system corresponding to the display area. The amplitude here may have a form of distance to characterize the changed distance of the pointing of the second electronic device during each sample period; or the amplitude may have a form of counting to characterize the number of changes of the pointing of the second electronic device with a preset distance step.

When the amplitude has the form of distance, in a plane coordinate system which is established based on the plane in which the display area is located, the second target location may be determined on the display area based on the changed distance and direction of the pointing of the second electronic device at the second timing and based on the first target location, to update and display the indicator at the second target location.

When the amplitude has the form of counting, in a plane coordinate system which is established based on the plane in which the display area is located, the second target location may be determined on the display area based on the changed distance (here, the distance is a product of the count and the preset distance step) and direction of the pointing of the second electronic device at the second timing and based on the first target location, to update and display the indicator at the second target location.

Figure 2B:
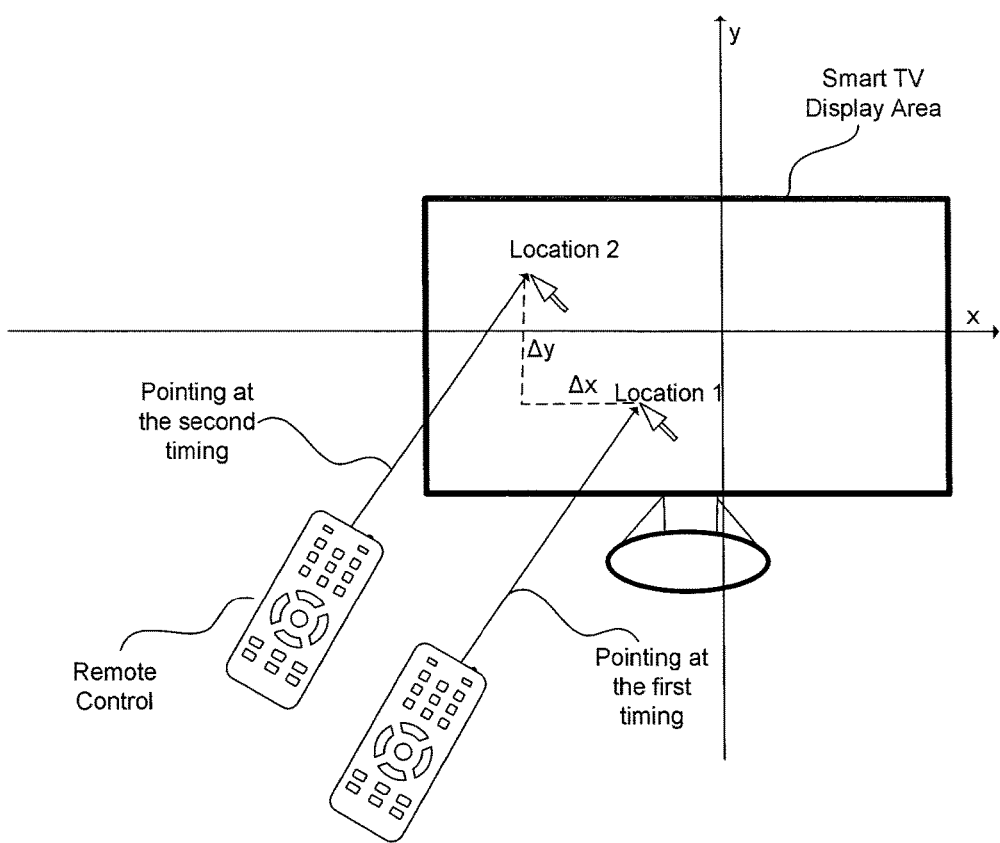
FIGS. 2b-2c are scenario diagrams showing the information processing method according to the second embodiment of the present disclosure.

One example is shown in FIG. 2b. At the first timing, the pointing of the second electronic device corresponds to Location 1 on the display area. When the user moves the second electronic device at the second timing, the first electronic device acquires the first real-time operation data corresponding to the second timing to determine the pointing of the second electronic device. In the plane coordinate system established based on the display area shown in FIG. 2b, the amplitude of the movement in the positive direction of the Y axis is $\Delta y$, and the amplitude of the movement in the negative direction of the X axis is $\Delta x$. Based on the coordinates of Location 1 in the coordinate system and the changed amplitude and direction of the pointing of the second electronic device, the coordinates of Location 2 in the plane coordinate system is determined, and the indicator is updated to be displayed at Location 2 on the display area based on the determined coordinates.

It is to be noted that step 203 may be performed for multiple times before the pointing of the second electronic device goes beyond a border of the display area. In other words, the second target location may be re-determined for multiple times and the indicators may be displayed at the re-determined second target locations for multiple times, to respond to the operations of location control which are performed by the user in the display area by changing the pointing of the second electronic device.

Step 204: it is determined whether the second target location is located on a border of the display area, and if yes, step 205 is performed; otherwise it turns to step 202.

"No" at step 204 characterizes that the pointing of the second electronic device does not go beyond the display area, and it turns to step 203. In response to the operation of changing the pointing of the second electronic device by the user, the indicator is displayed at a location on the display area corresponding to the pointing of the second electronic device (corresponding to the second target location). If the result of step 204 is Yes, which means that the pointing of the second electronic device may go beyond a border of display area after the second timing, step 205 is performed.

Step 205: a second real-time operation data corresponding to a third timing which is later than the second timing is acquired.

Step 206: Whether the pointing of the second electronic device goes beyond the border of the display area is determined based on the second real-time operation data. If yes, then step 207 is performed; otherwise, it turns to step 205.

Step 206 is a process performed when the pointing of the second electronic device reaches the border of the display area, for determining whether the pointing of the second electronic device goes beyond the border of the display area or not. The first electronic device analyzes the real-time operation data at each timing (the third timing) corresponding to each sample period after the second timing, to acquire the information of changed amplitude and direction of the pointing of the second electronic device. In a plane coordinate system which is established based on the plane in which the display area is located, a location pointed by the pointing of the second electronic device at the third timing (indicated by the coordinates in the plane coordinate system) is acquired based on the changed amplitude and direction and based on the second target location (indicated by the coordinates in the plane coordinate system). Whether this location goes beyond the coordinate range of the display area in the plane coordinate system is determined. If yes, then it is determined that the pointing of the second electronic device goes beyond the border of the display area at the third timing; otherwise, it is determined that the pointing of the second electronic device does not go beyond the border of the display area at the third timing.

If it is determined that the pointing of the second electronic device does not go beyond the border of the display area (the pointing of the second electronic device may still be located on the border of the display area, or re-enter the display area), it turns to step 205. When the timing corresponding to the next sample period (corresponding to the second timing) comes, the determination of whether the pointing of the second electronic device goes beyond the border of the display area based on the real-time operation data at the current sample period timing is continued.

Step 207: a first statistics result and a second statistics result corresponding to a third real-time operation data between the third timing and a fourth timing (which is a timing later than the third timing) are determined.

The timing corresponding to each sample period of the real-time operation data after the third timing is a fourth timing. In other words, in step 207, for any timing corresponding to a sample period of the real-time operation data after the third timing, a corresponding first statistics result and second statistics result are determined.

The first statistics result characterizes the changed amplitude and direction of the pointing of the second electronic device on a first coordinate axis (the first coordinate axis is a coordinate axis in the plane coordinate system established based on the plane in which the display area is located) between the third timing and the fourth timing; here, the amplitude may be characterized by the distance of the movement of the pointing of the second electronic device, or by the number of changes of the pointing of the second electronic devices (representing the number of changes of the pointing of the second electronic device with a preset distance step).

The second statistics result characterizes the changed amplitude and direction of the pointing of the second electronic device on a second coordinate axis (the second coordinate axis is a coordinate axis in the plane coordinate system established based on the plane in which the display area is located) between the third timing and the fourth timing; here, the amplitude may be characterized by the distance of the movement of the pointing of the second electronic device, or by the number of changes of the pointing of the second electronic devices (representing the number of changes of the pointing of the second electronic device with a preset distance step).

Step 208: a corresponding third target location is determined in the coordinate system corresponding to the display area based on the changed amplitude and direction characterized by the first statistics result and the second statistics result, with reference to the second target location.

Step 209: whether the determined coordinates are located within the coordinate range corresponding to the display area (comprising the border of the display area) is determined. If yes, step 210 is performed; otherwise, it turns to step 207.

When it is determined to be "Yes," this characterizes that the pointing of the second electronic device re-enters the display area at the fourth timing, and the indicator is required to be displayed at the location on the display area which matches with the pointing of the second electronic device (corresponding to the third target location). If the determined coordinates are not located within the coordinate range of the display area, this means that the pointing of the second electronic device has not re-entered the display area yet, and it turns to step 207, to determine the first statistics result and the second statistics result based on the real-time operation data between the third timing and the next sample period timing (corresponding to the fourth timing). Further, it is determined whether the pointing of the second electronic device re-enters the display area.

Step 210: the indicator is updated to be displayed on the display area based on the determined coordinates.

Figure 2C:
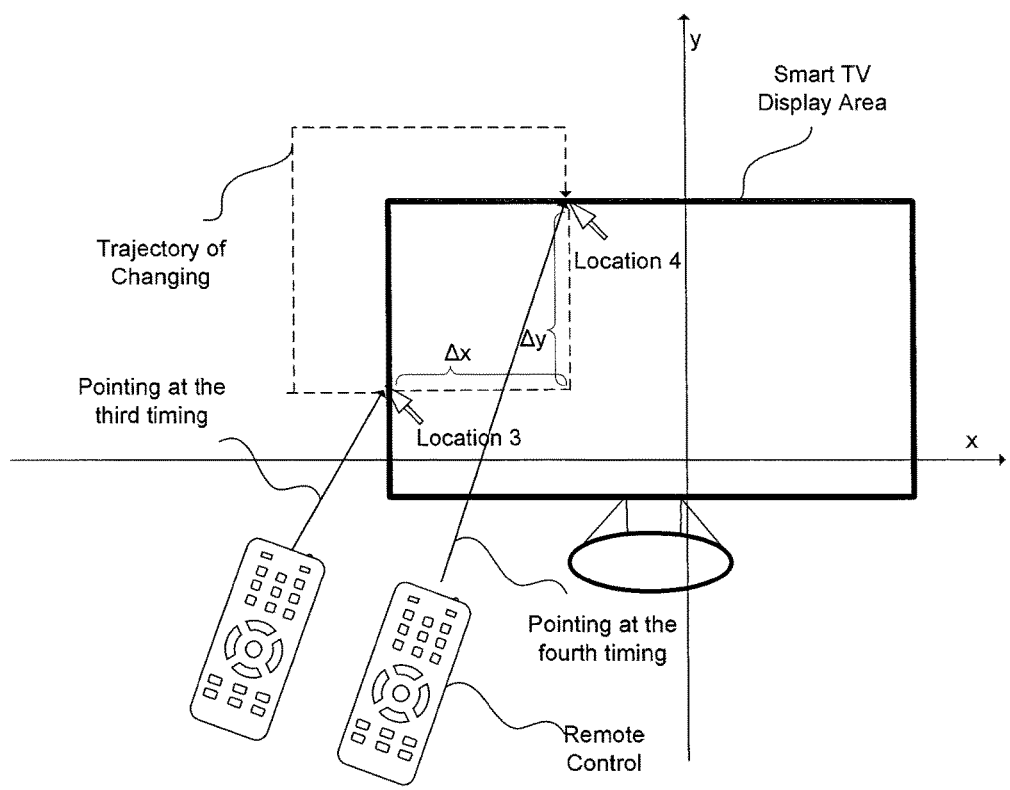

One diagram is shown in FIG. 2*c*. The pointing of the second electronic device matches with Location 3 at the border of the display area at the third timing. That is, the pointing of the second electronic device reaches the border of the display area at the third timing. If the changing trajectory of the pointing of the second electronic device is as shown by FIG. 2*c* after the pointing of the second electronic device goes beyond the border of the display area from Location 3, then in step 207 through step 209, the changed amplitudes and directions of the location of the pointing of the second electronic device in the plane coordinate system with respect to Location 3 (corresponding to the second target location) on the X axis (corresponding to the changed amplitude Δx on the positive direction of X axis in FIG. 2*c*) and on the Y axis (corresponding to the changed amplitude Δy on the positive direction of Y axis in FIG. 2*c*) are determined based on the first statistics result and the second statistics result corresponding to the third real-time operation data between the third timing and the fourth timing; the plane coordinates of Location 4 (corresponding to the third target location) of the pointing of the second electronic device in the plane coordinate system at the fourth timing is determined; it is determined that Location 4 is located on the border of the display area based on the plane coordinates and the coordinate range of the display area; and the indicator is updated to be displayed at Location 4 on the display area based on the coordinates of Location 4 in the plane coordinate system.

Third Embodiment

The present embodiment provides an information processing method in a first electronic device. In practical, the first electronic device may be a television, a projector, or any other display device. The first electronic device supports displaying of an indicator (for example, a conventional arrow) at a location within its own display area, the location matching with a pointing of a second electronic device on the display area, to indicate a location in the display area that can be operated by means of the pointing of the second electronic device (which may be a remote control or a smart phone) on the display area (hereinafter, referred as "the pointing"). In this way, the user is enabled to use the second electronic device to control the first electronic device for achieving web browsing, multimedia file playback, gaming, or the like.

Figure 3A:
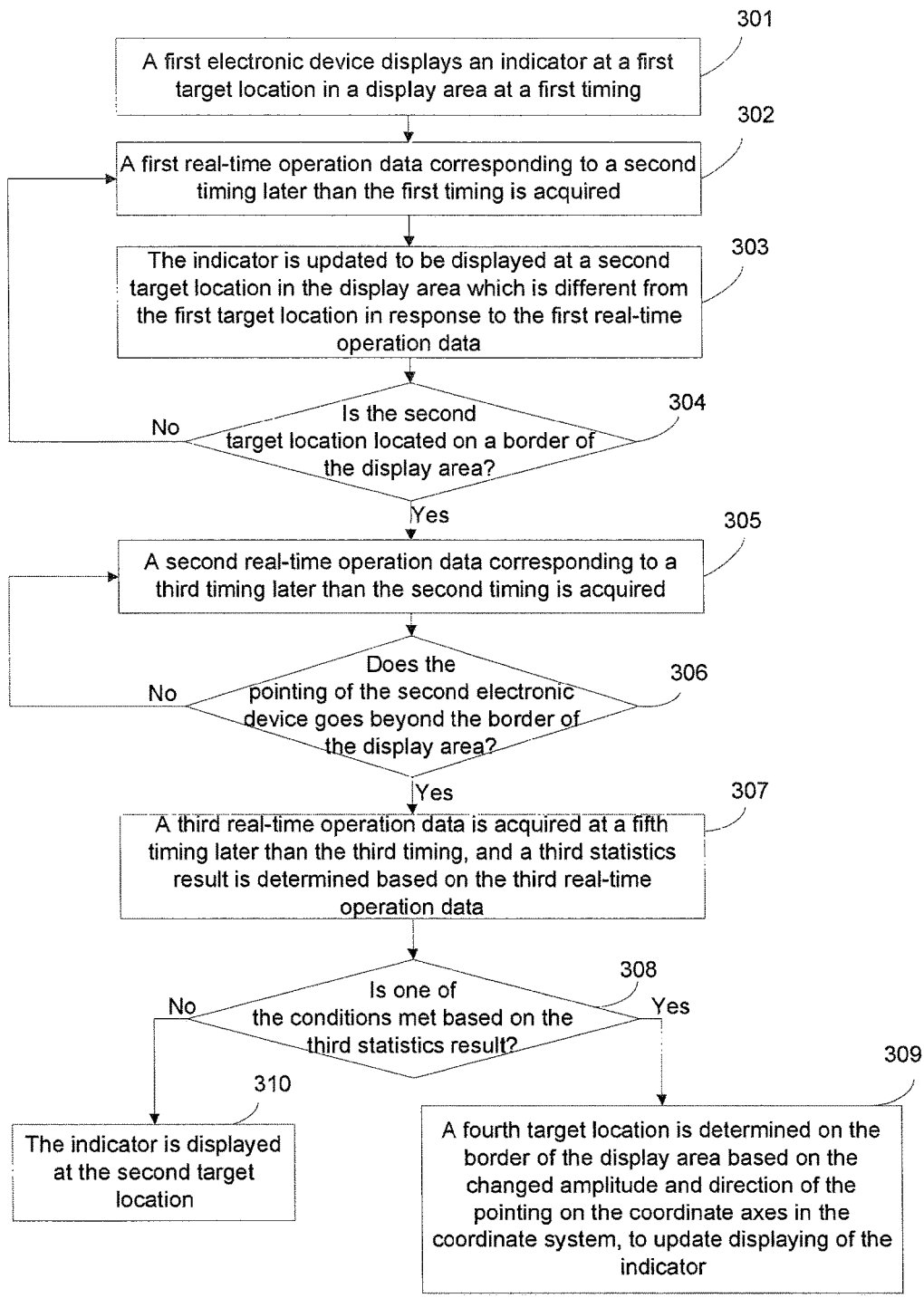
FIG. 3a is a flow chart showing an information processing method according to a third embodiment of the present disclosure.

As shown in FIG. 3*a*, the information processing method of the present embodiment comprises steps as follows.

Step 301: a first electronic device displays an indicator at a first target location on a display area at a first timing.

The first target location matches with a pointing of a second electronic device on the display area of the first electronic device at the first timing.

Step 302: a first real-time operation data corresponding to a second timing which is later than the first timing is acquired.

Real-time operation data corresponding to different timings can be acquired by the first electronic device collecting the location/posture of the second electronic device. For example, the first electronic device may collect data by at least one of:

Image Capture (3D camera or array of cameras), where the location and/or posture of the second electronic device may be determined based on the data collected by analyzing captured images; and Sound Wave Detection, where the location and/or posture of the second electronic device may be determined based on the data collected by analyzing sound detected according to the echolocation principle.

Real-time operation data corresponding to different timings may also be collected and transmitted to the first electronic device by the second electronic device. The second electronic device may use a sensor, such as a gyro, to collect real-time operation data characterizing the location/posture of the second electronic device.

The sample period of the real-time operation data may depend on the requirement on the operation data in terms of real time in actual applications. The higher the requirement of real time is, the shorter the sample period is.

Step 303: the indicator is updated to be displayed at a second target location on the display area different from the first target location, in response to the first real-time operation data.

The second target location may be determined by: analyzing the first real-time operation data to acquire the changed amplitude and direction of the pointing of the second electronic device at the second timing; determining, with reference to the first target location, the coordinates corresponding to the changed amplitude and direction of the pointing of the second electronic device (the second target location) in a plane coordinate system corresponding to the display area. The amplitude here may have a form of distance to characterize the changed distance of the pointing of the second electronic device during each sample period; or the amplitude may have a form of counting to characterize the number of changes of the pointing of the second electronic device with a preset distance step.

When the amplitude has the form of distance, in a plane coordinate system which is established based on the plane in which the display area is located, the second target location may be determined on the display area based on the changed distance and direction of the pointing of the second electronic device at the second timing and based on the first target location, to update and display the indicator at the second target location.

When the amplitude has the form of counting, in a plane coordinate system which is established based on the plane in which the display area is located, the second target location may be determined on the display area based on the changed distance (here, the distance is a product of the count and the preset distance step) and direction of the pointing of the second electronic device at the second timing and based on the first target location, to update and display the indicator at the second target location.

It is to be noted that step 303 may be performed for multiple times before the pointing of the second electronic device goes beyond a border of the display area. In other words, the second target location may be re-determined for multiple times and the indicators may be displayed at the re-determined second target locations for multiple times, to respond to the operations of location control which are performed by the user in the display area by changing the pointing of the second electronic device.

Step 304: it is determined whether the second target location is located on a border of the display area, and if yes, step 305 is performed; otherwise it turns to step 302.

"No" at step 304 characterizes that the pointing of the second electronic device does not go beyond the display area, and it turns to step 303. In response to the operation of changing the pointing of the second electronic device by the user, the indicator is displayed at the location on the display area corresponding to the pointing of the second electronic device (corresponding to the second target location). If the result of step 304 is Yes, which means that the pointing of the second electronic device may go beyond the border of display area after the second timing, step 305 is performed.

Step 305: a second real-time operation data corresponding to a third timing which is later than the second timing is acquired.

Step 306: Whether the pointing of the second electronic device goes beyond the border of the display area is determined based on the second real-time operation data. If yes, then step 307 is performed; otherwise, it turns to step 305.

Step 306 is a process performed when the pointing of the second electronic device reaches the border of the display area, for determining whether the pointing of the second electronic device goes beyond the border of the display area or not. The first electronic device analyzes the real-time operation data at each timing (the third timing) corresponding to each sample period after the second timing, to acquire the information of changed amplitude and direction of the pointing of the second electronic device. In a plane coordinate system which is established based on the plane in which the display area is located, a location pointed by the pointing of the second electronic device at the third timing (indicated by the coordinates in the plane coordinate system) is acquired based on the changed amplitude and direction and based on the second target location (indicated by the coordinates in the plane coordinate system). Whether this location goes beyond the coordinate range of the display area in the plane coordinate system is determined. If yes, then it is determined that the pointing of the second electronic device goes beyond the border of the display area at the third timing; otherwise, it is determined that the pointing of the second electronic device does not go beyond the border of the display area at the third timing. If it does not go beyond the border of the display area (the pointing of the second electronic device may still be located on the border of the display area, or re-enter the display area), then it turns to step 305. When the timing corresponding to the next sample period (corresponding to the second timing) comes, the determination of whether the pointing of the second electronic device goes beyond the border of the display area based on the real-time operation data at the current sample period timing is continued.

Step 307: a third real-time operation data is acquired at a fifth timing which is later than the third timing, and a third statistics result is determined based on the third real-time operation data.

The third statistics result characterizes the changed amplitude and direction of the pointing of the second electronic devices on the X axis and/or the changed amplitude and direction of the pointing of the second electronic devices on the Y axis.

Step 308: it is determined whether either of the following condition is met based on the third statistics result:

the coordinate of the pointing of the second electronic device in the coordinate system on the first coordinate axis goes beyond the corresponding coordinate range of the display area on the first coordinate axis; or the coordinate of the pointing of the second electronic device in the coordinate system on the second coordinate axis goes beyond the corresponding coordinate range of the display area on the second coordinate axis.

If yes, step 309 is performed; otherwise, step 310 is performed.

Step 309: the indicator is updated to be displayed at the second target location.

In other words, when the pointing of the second electronic device goes beyond the border of the display area, if one of the coordinates of the pointing of the second electronic device in the coordinate system (the coordinate system corresponding to the display area) on a coordinate axis goes beyond the coordinate range of the display area in a direction of this coordinate axis, the indicator is continued to be displayed at the location in the border of the display area where the second electronic device goes beyond the border of the display area (corresponding to the second target location).

Step 310: a fourth target location is determined on the border of the display area based on the changed amplitude and direction of the pointing of the second electronic device on the coordinate axis in the coordinate system, to update and display the indicator.

The changed amplitude and direction of the pointing of the second electronic device on the coordinate axis in the coordinate system comprises: the changed amplitude and direction of the pointing of the second electronic device on the first coordinate axis in the coordinate system; and/or the changed amplitude and direction of the pointing of the second electronic device on the second coordinate axis in the coordinate system.

1) When the coordinate of the location of the second electronic device on the first coordinate axis in the coordinate system goes beyond the coordinate range of the display area on the first coordinate axis, and the coordinate of the location of the second electronic device on the second coordinate axis in the coordinate system does not go beyond the coordinate range of the display area on the second coordinate axis, a border of the display area closet to the location of the pointing of the second electronic device on the first coordinate axis in the coordinate system is determined; on the determined border of the display area, the coordinate of the fourth target location is determined on the determined border of the display area based on the coordinate of the location of the pointing of the second electronic device on the second coordinate axis in the coordinate system (the fourth target location is located on the determined border of the display area, and the coordinate of the fourth target location on the second coordinate axis is same as the coordinate of the location of the pointing of the second electronic device on the second coordinate axis in the coordinate system).

2) When the coordinate of the location of the second electronic device on the first coordinate axis in the coordinate system does not go beyond the coordinate range of the display area on the first coordinate axis, and the coordinate of the location of the second electronic device on the second coordinate axis in the coordinate system goes beyond the coordinate range of the display area on the second coordinate axis, a border of the display area closet to the location of the pointing of the second electronic device on the second coordinate axis in the coordinate system is determined; on the determined border of the display area, the coordinate of the fourth target location is determined on the determined border of the display area based on the coordinate of the location of the pointing of the second electronic device on the first coordinate axis in the coordinate system (the fourth target location is located on the determined border of the display area, and the coordinate of the fourth target location on the first coordinate axis is same as the coordinate of the location of the pointing of the second electronic device on the first coordinate axis in the coordinate system).

Figure 3B:
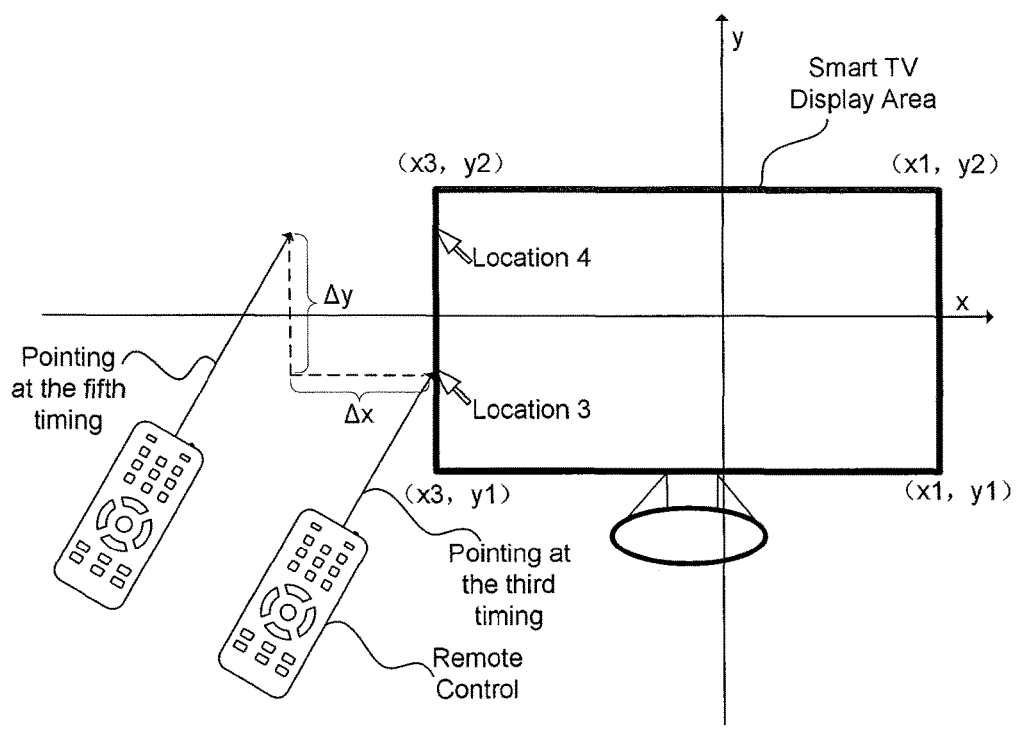
FIGS. 3b-3e are scenario diagrams showing the information processing method according to the third embodiment of the present disclosure.
Figure 3C:
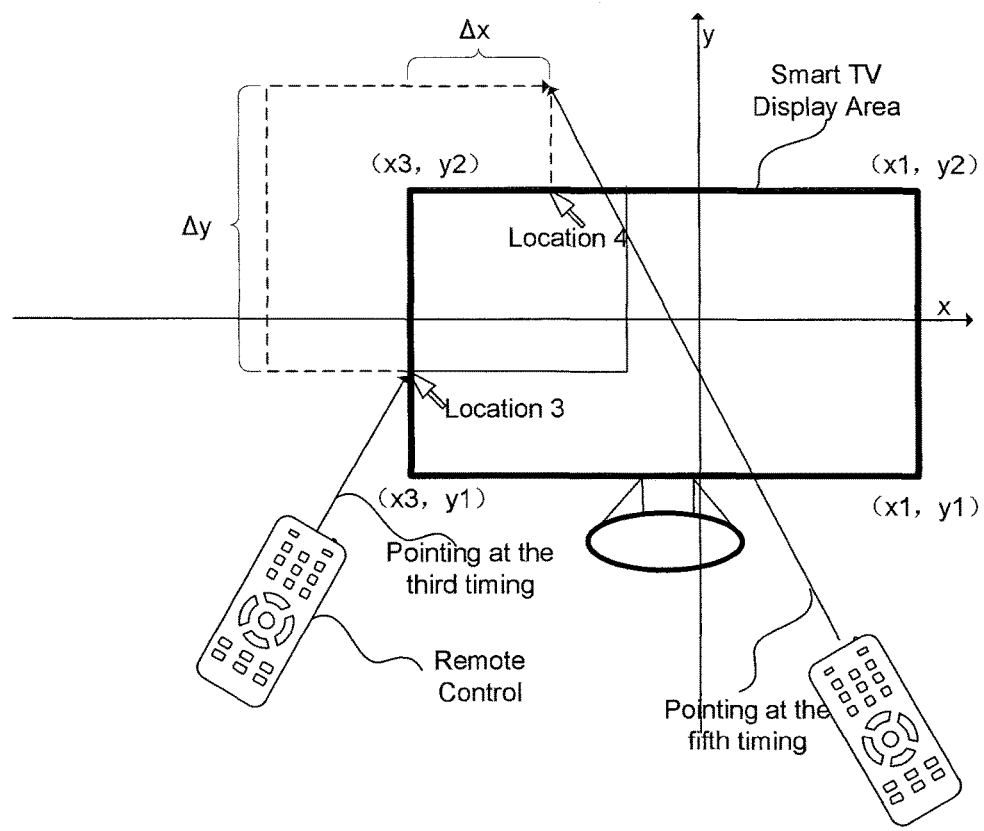

One example is shown in FIG. 3b and FIG. 3c. The second electronic device arrives at the edge of the display area, i.e. Location 3, at the third timing, and goes beyond the border of the display area from Location 3. At the fifth timing, the second electronic device points at Location 4 in the plane coordinate system. The coordinates of Location 4 in the plane coordinate system may be determined as follows: the third statistics result is determined based on the third real-time operation data between the third timing and the fifth timing, the third statistics result characterizing the changed amplitude and direction of the pointing of the second electronic device on the X axis (corresponding to the changed $\Delta x$ in the negative direction of the X axis in FIG. 3b) and on the Y axis (corresponding to the changed $\Delta y$ in the positive direction of the Y axis in FIG. 3b) in the coordinate system between the third timing and the fifth timing; the coordinates of Location 3 in the plane coordinate system is changed by $\Delta y$ in the positive direction of the Y axis and by $\Delta x$ in the negative direction of the X axis, to acquire the coordinates of Location 4 in the plane coordinate system; since the coordinate of Location 4 on the Y axis (corresponding to the coordinate on the second coordinate axis) is still located within the coordinate range (y1, y2) of the display area on the Y axis, the indicator is updated to be displayed on the border of the display area, beyond which the second electronic device goes, based on the coordinate of Location 4 on the Y axis, until the coordinate of the pointing of the second electronic device on the Y axis in the plane coordinate system goes beyond the coordinate range (y1, y2) of the display area.

Figure 3D:
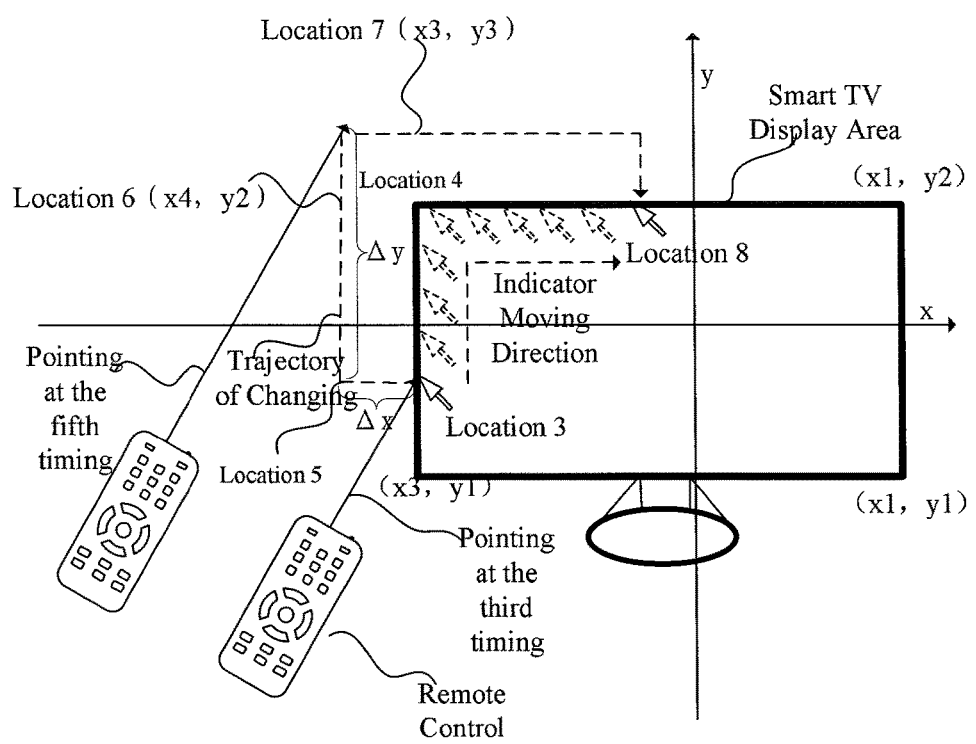

As shown in FIG. 3d, the pointing of the second electronic device arrives at Location 3 at the third timing, and goes beyond the display area from Location 3. The pointing of the second electronic device changes in accordance with the changing trajectory shown in FIG. 3d. When the location of the pointing of the second electronic device in the plane coordinate system moves from Location 5 to Location 6, based on the above manner in which the coordinates of the location of the pointing of the second electronic device in the plane coordinate system are determined, it can be determined that the coordinate of the location of the pointing of the second electronic device on the Y axis in the plane coordinate system is located within the coordinate range of the display area on the Y axis. Therefore, based on the movement direction of the indicator shown in FIG. 3d, the indicator is displayed on the border of the display area in sync with the changes of the pointing of the second electronic device, until the location of the pointing of the second electronic device in the coordinate system arrives at Location 4. At this time, the coordinates of the location of the pointing of the second electronic device in the coordinate system are not located within the coordinate range of the display area either on the X axis or on the Y axis. When the pointing of the second electronic device changes from Location 6 to Location 7, the indicator is always displayed at Location 4 until the pointing of the second electronic device changes from Location 7 to Location 8. Based on the above manner in which the coordinates of the location of the pointing of the second electronic device in the coordinate system are determined, it can be determined that the coordinate of the location of the pointing of the second electronic device on the X axis in the coordinate system is located within the coordinate range (x1, x2) of the display area on the X axis. Based on the coordinates of Location 4 and the delta of the amplitude of the changing of the pointing of the second electronic device with respect to Location 4 in the positive direction of the X axis in the process of moving from Location 4 to Location 8, the coordinates of the indicator in the display area are determined to update and display the indicator (the coordinate of the indicator on the Y axis is same as the coordinate of Location 4 on the Y axis).

The present embodiment provides following technical effects. When the pointing of the second electronic device goes beyond the border of the display area, if the coordinate of the pointing of the second electronic device on the first coordinate axis in the coordinate system (the coordinate system corresponding to the display area) has not gone beyond the coordinate range of the display area on this coordinate axis yet, the location of the indicator on the display area is determined based on the coordinate of the pointing of the second electronic device on this coordinate axis to update and display the indicator, until the coordinates of the pointing of the second electronic device on both of the coordinate axes go beyond the coordinate range of the display area.

Figure 3E:
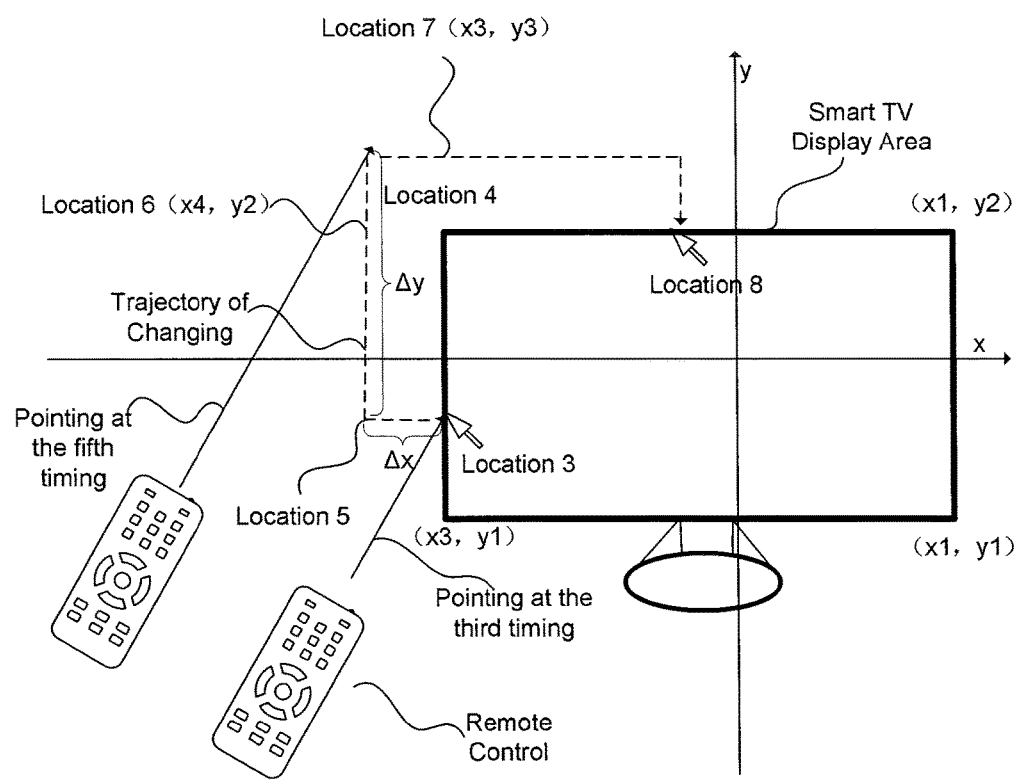

It is to be noted that in the present embodiment other processing methods may be employed than the one of Step 301. When the pointing of the second electronic device goes beyond the border of the display area, if the coordinate of the pointing of the second electronic device on any coordinate axis in the coordinate system (the coordinate system corresponding to the display area) goes beyond the coordinate range of the display area on this coordinate axis, updating of the displaying of the indicator is aborted (that is, the indicator is continued to be displayed at the location where the second electronic device goes beyond the border of the display area) until the pointing of the second electronic device re-enters the display area. At this time, the displaying of the indicator is updated based on the pointing of the second electronic device. One example is shown in FIG. 3e. The pointing of the second electronic device arrives at Location 3 at the third timing, and goes beyond the border of the display area from Location 3. In the process where the pointing of the second electronic device changes from Location 3 to Location 7 in accordance with the changing trajectory shown in FIG. 3e, the coordinate of the pointing of the second electronic device on the X axis goes beyond the coordinate range of the display area on the X axis, and therefore the indicator is always displayed at Location 3 where the pointing of the second electronic device goes beyond the border of the display area. In the process where the pointing of the second electronic device changes from Location 7 to Location 8 in accordance with the changing trajectory shown in FIG. 3e, the coordinate of the pointing of the second electronic device on the y axis goes beyond the coordinate range of the display area on the y axis, and therefore the indicator is always displayed at Location 3 where the pointing of the second electronic device goes beyond the border of the display area, until the pointing of the second electronic device re-enters the border of the display area from Location 8. At this time, the indicator is updated to be displayed at Location 8.

Fourth Embodiment

The present embodiment provides an information processing method in a first electronic device. In practical, the first electronic device may be a television, a projector, or any other display device. The first electronic device supports displaying of an indicator (for example, a conventional arrow) at a location within its own display area, the location matching with a pointing of a second electronic device on the display area, to indicate a location on the display area that can be operated by means of the pointing of the second electronic device (which may be a remote control or a smart phone) on the display area (hereinafter, referred as "the pointing"). In this way, the user is enabled to use the second electronic device to control the first electronic device for achieving web browsing, multimedia file playback, gaming, or the like.

Figure 4A:
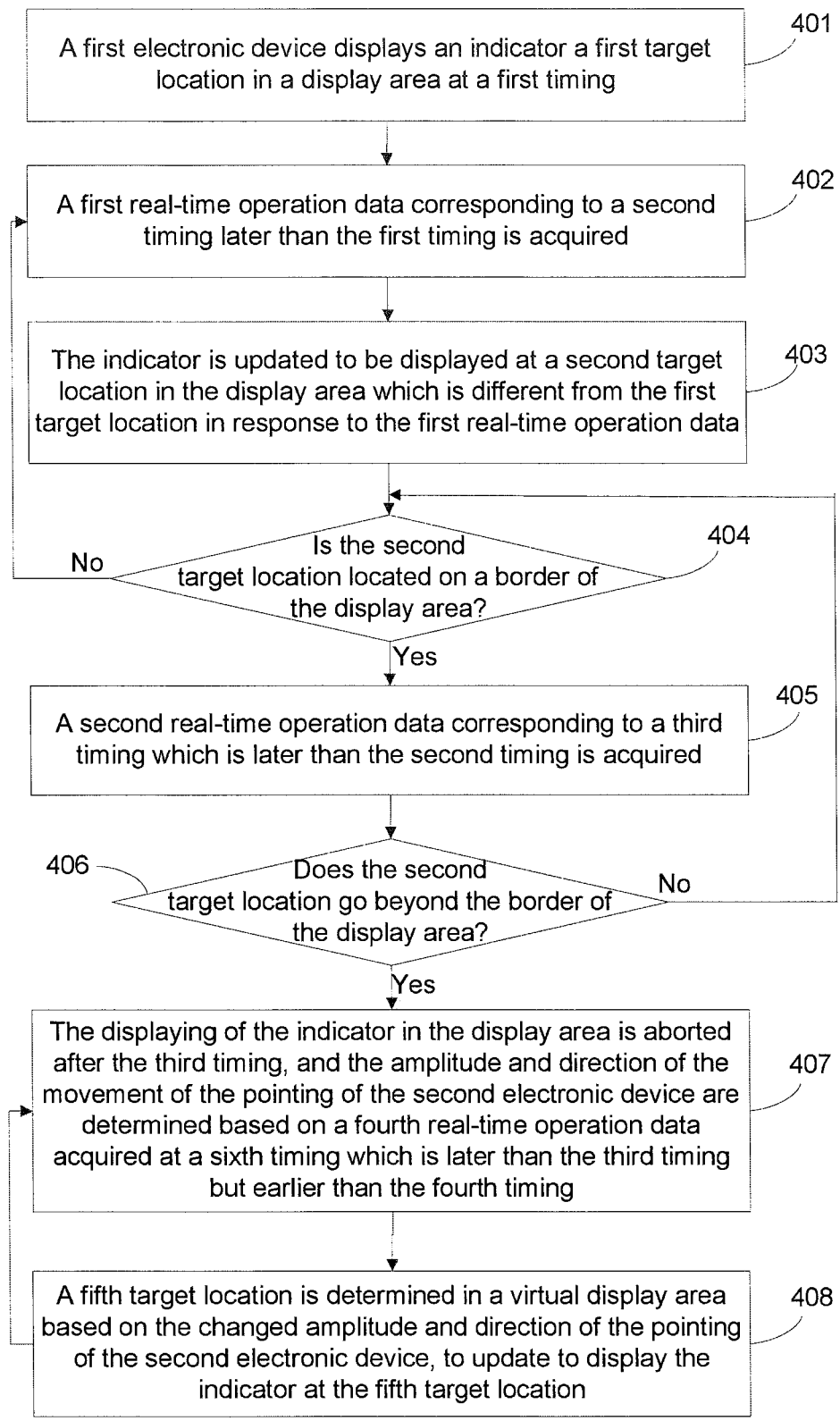
FIG. 4a is a flow chart showing an information processing method according to a fourth embodiment of the present disclosure.

As shown in FIG. 4a, the information processing method of the present embodiment comprises steps as follows.

Step 401: a first electronic device displays an indicator at a first target location on a display area at a first timing.

The first target location matches with a pointing of a second electronic device on the display area of the first electronic device at the first timing.

Step 402: a first real-time operation data corresponding to a second timing which is later than the first timing is acquired.

Real-time operation data corresponding to different timings can be acquired by the first electronic device collecting the location/posture of the second electronic device. For example, the first electronic device may collect data by at least one of:

Image Capture (3D camera or array of cameras), where the location and/or posture of the second electronic device may be determined based on the data collected by analyzing captured images; and Sound Wave Detection, where the location and/or posture of the second electronic device may be determined based on the data collected by analyzing sound detected according to the echolocation principle.

Real-time operation data corresponding to different timings may also be collected and transmitted to the first electronic device by the second electronic device. The second electronic device may use a sensor, such as a gyro, to collect real-time operation data characterizing the location/posture of the second electronic device.

The sample period of the real-time operation data may depend on the requirement on the operation data in terms of real time in actual applications. The higher the requirement of real time is, the shorter the sample period is.

Step 403: the indicator is updated to be displayed at a second target location on the display area different from the first target location, in response to the first real-time operation data.

The second target location may be determined by: analyzing the first real-time operation data to acquire the changed amplitude and direction of the pointing of the second electronic device at the second timing; determining, with reference to the first target location, the coordinates corresponding to the changed amplitude and direction of the pointing of the second electronic device (the second target location) in a plane coordinate system corresponding to the display area. The amplitude here may have a form of distance to characterize the changed distance of the pointing of the second electronic device during each sample period; or the amplitude may have a form of counting to characterize the number of changes of the pointing of the second electronic device with a preset distance step.

When the amplitude has the form of distance, in a plane coordinate system which is established based on the plane in which the display area is located, the second target location may be determined on the display area based on the changed distance and direction of the pointing of the second electronic device at the second timing and based on the first target location, to update and display the indicator at the second target location.

When the amplitude has the form of counting, in a plane coordinate system which is established based on the plane in which the display area is located, the second target location may be determined on the display area based on the changed distance (here, the distance is a product of the count and the preset distance step) and direction of the pointing of the second electronic device at the second timing and based on the first target location, to update and display the indicator at the second target location.

It is to be noted that step 403 may be performed for multiple times before the pointing of the second electronic device goes beyond a border of the display area. In other words, the second target location may be re-determined for multiple times and the indicators may be displayed at the re-determined second target locations for multiple times, to respond to the operations of location control which are performed by the user in the display area by changing the pointing of the second electronic device.

Step 404: it is determined whether the second target location is located on a border of the display area, and if yes, step 405 is performed; otherwise it turns to step 402.

"No" at step 404 characterizes that the pointing of the second electronic device does not go beyond the display area, and it turns to step 403. In response to the operation of changing the pointing of the second electronic device by the user, the indicator is displayed at the location on the display area corresponding to the pointing of the second electronic device (corresponding to the second target location). If the result of step 404 is Yes, which means that the pointing of the second electronic device may go beyond the border of display area after the second timing, step 405 is performed.

Step 405: a second real-time operation data corresponding to a third timing which is later than the second timing is acquired.

Step 406: Whether the pointing of the second electronic device goes beyond the border of the display area is determined based on the second real-time operation data. If yes, then step 407 is performed; otherwise, it turns to step 404.

Step 406 is a process performed when the pointing of the second electronic device reaches the border of the display area, for determining whether the pointing of the second electronic device goes beyond the border of the display area or not. The first electronic device analyzes the real-time operation data at each timing (the third timing) corresponding to each sample period after the second timing, to acquire the information of changed amplitude and direction of the pointing of the second electronic device. In a plane coordinate system which is established based on the plane in which the display area is located, a location pointed by the pointing of the second electronic device at the third timing (indicated by the coordinates in the plane coordinate system) is acquired based on the changed amplitude and direction and based on the second target location (indicated by the coordinates in the plane coordinate system). Whether this location goes beyond the coordinate range of the display area in the plane coordinate system is determined. If yes, then it is determined that the pointing of the second electronic device goes beyond the border of the display area at the third timing; otherwise, it is determined that the pointing of the second electronic device does not go beyond the border of the display area at the third timing. If it is determined that the pointing of the second electronic device does not go beyond the border of the display area (the pointing of the second electronic device may still be located on the border of the display area, or re-enter the display area), it turns to step 404. When the timing corresponding to the next sample period (corresponding to the second timing) comes, the determination of whether the pointing of the second electronic device goes beyond the border of the display area based on the real-time operation data at the current sample period timing is continued.

Step 407: The displaying of the indicator on the display area is aborted after the third timing, and the amplitude and direction of the movement of the pointing of the second electronic device is determined based on a fourth real-time operation data acquired at a sixth timing which is later than the third timing and earlier than the fourth timing.

Step 408: A fifth target location is determined on a virtual display area based on the changed amplitude and direction of the pointing of the second electronic device to update and display the indicator at the fifth target location.

The virtual display area is used for displaying in conjunction with the display area, and the area of the virtual display area may be infinite large. The changed amplitude and direction of the pointing of the second electronic device comprises: the changed amplitude and direction of the pointing of the second electronic device on a first coordinate axis in the coordinate system; and/or the changed amplitude and direction of the pointing of the second electronic device on a second coordinate axis in the coordinate system. The amplitude here may have a form of distance to characterize the changed distance of the pointing of the second electronic device during each sample period; or the amplitude may have a form of counting to characterize the number of changes of the pointing of the second electronic device with a preset distance step.

When the amplitude has the form of distance, in a plane coordinate system which is established based on the plane in which the display area is located, with reference to the plane coordinates of the second target location, the plane coordinates of the second target location are adjusted based on the changed distance and direction of the pointing of the second electronic device at the third timing to acquire coordinates of a fifth target location, such that the indicator is displayed in the virtual display area based on the coordinates of the fifth target location.

When the amplitude has the form of counting, in a plane coordinate system which is established based on the plane in which the display area is located, with reference to the plane coordinates of the second target location, the plane coordinates of the second target location are adjusted based on the changed amplitude (here, the amplitude is a product of the count and the preset distance step) and direction of the pointing of the second electronic device at the third timing to acquire coordinates of the fifth target location in the plane coordinate system, such that the indicator is displayed in the virtual display area based on the coordinates of the fifth target location.

Step 408: when the fifth real-time operation data acquired at the fourth timing (the timing after the third timing but different from the sixth timing) characterizes that the pointing enters the display area from the virtual display area, a third target location is determined on the display area based on the changed amplitude and direction of the pointing characterized by the fourth statistics result corresponding to the fifth real-time operation data, to display the indicator at the third target location.

Figure 4B:
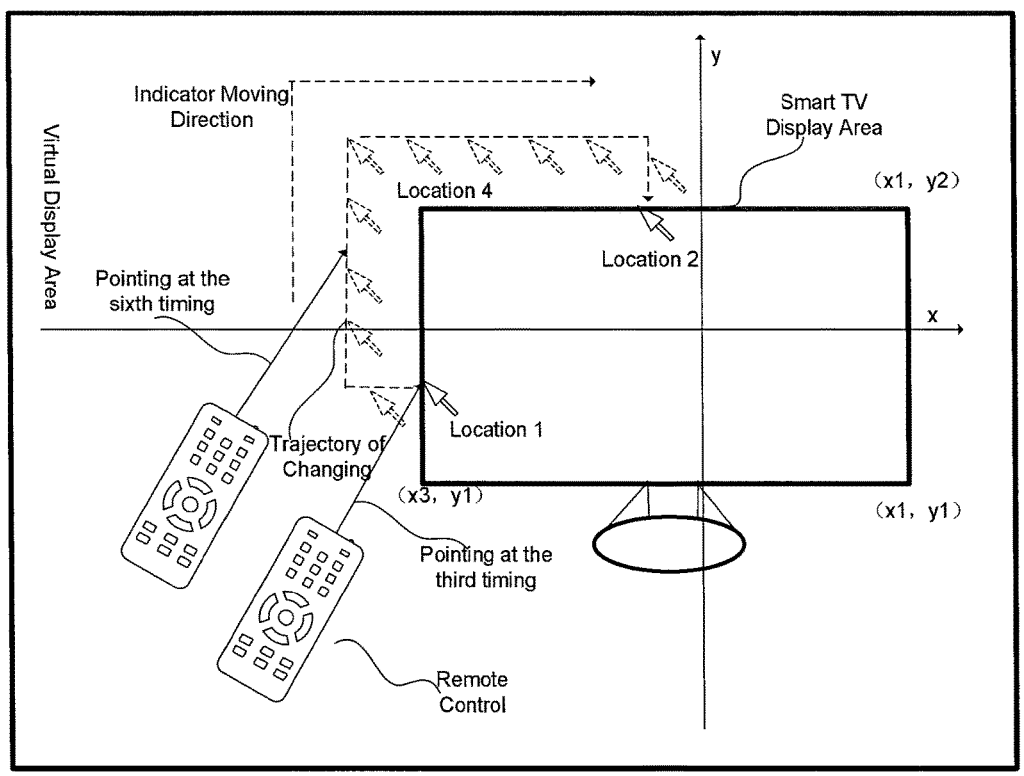
FIGS. 4b and 4c are scenario diagrams showing the information processing method according to the fourth embodiment of the present disclosure.

One example is shown in FIG. 4b. The pointing of the second electronic device changes to reach Location 1 on the border of the display area at the third timing, and goes beyond the border of the display area from Location 1. At this time, the location of the pointing of the second electronic device in the plane coordinate system is located in the coordinate range of the virtual display area. Based on the above manner in which the fifth target location is determined, the coordinates of the fifth target location may be determined in the plane coordinate system, and the indicator (a dotted arrow) is displayed in the virtual display area based on the coordinates of the fifth target location. When the pointing of the second electronic device changes along the trajectory shown in FIG. 4b, based on the repetitions of the above steps 406 and 407, the coordinates corresponding to the changing trajectory of the pointing of the second electronic are determined on the display area (corresponding to the fifth target location), and the indicator is displayed in the virtual display area based on the determined coordinates. When the pointing of the second electronic device changes to Location 2 (corresponding to the third target location) at the fourth timing, the coordinates of Location 2 may be determined as follows: the statistics result (corresponding to the fourth statistics result) of the fifth real-time operation data acquired at the fourth timing is determined, where the fourth statistics result characterizes the changed amplitude and direction of the second electronic device; the third target location (corresponding to Location 2) located on the display area is determined based on the changed amplitude and direction and based on the coordinates of the fifth target location; and the indicator is displayed at Location 2 and the displaying of the indicator in the virtual display area is stopped.

Figure 4C:
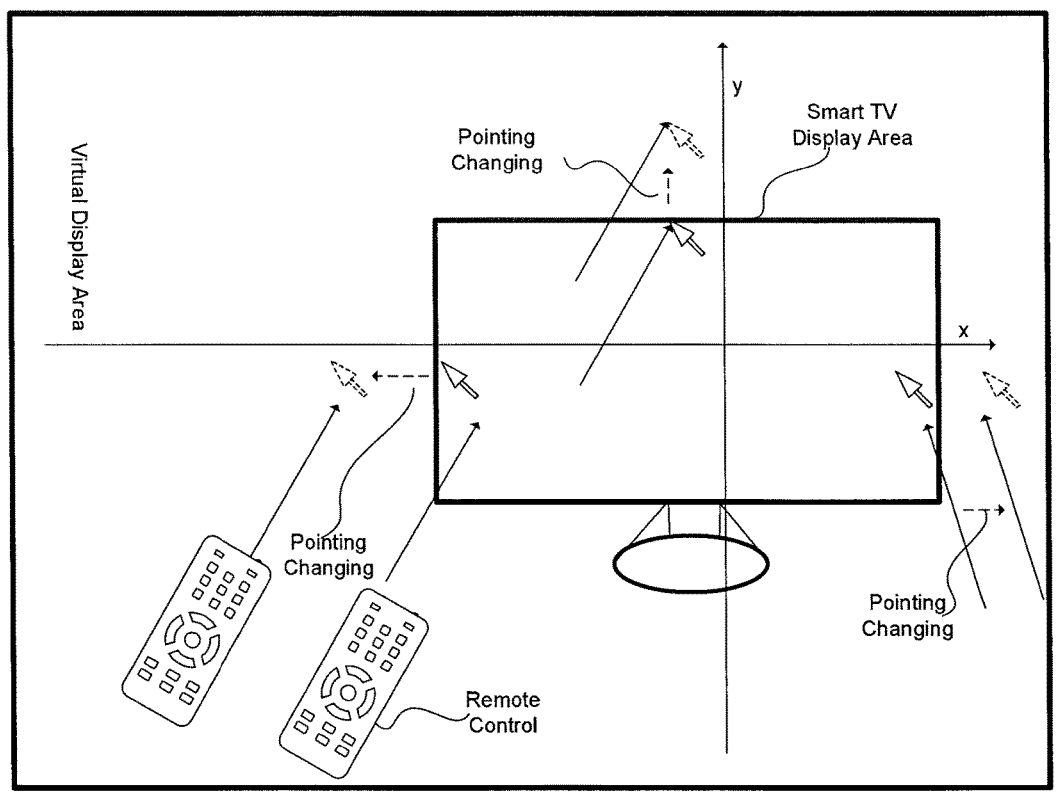

It is to be noted that the example in FIG. 4b where the pointing of the second electronic device goes beyond the border of the display area from the edge on which Location 1 is located is merely used for the purpose of illustration. As shown in FIG. 4c, when the pointing of the second electronic device goes beyond the border of the display area from any edge of the display area, the electronic device supports displaying of the indicator at the location of the pointing of the second electronic device in the virtual display area based on the pointing of the second electronic device.

Fifth Embodiment

The present embodiment provides an information processing method in a first electronic device. In practical, the first electronic device may be a television, a projector, or any other display device. The first electronic device supports displaying of an indicator (for example, a conventional arrow) at a location within its own display area, the location matching with a pointing of a second electronic device on the display area, to indicate a location on the display area that can be operated by means of the pointing of the second electronic device (which may be a remote control or a smart phone) on the display area (hereinafter, referred as "the pointing"). In this way, the user is enabled to use the second electronic device to control the first electronic device for achieving web browsing, multimedia file playback, gaming, or the like.

Figure 5A:
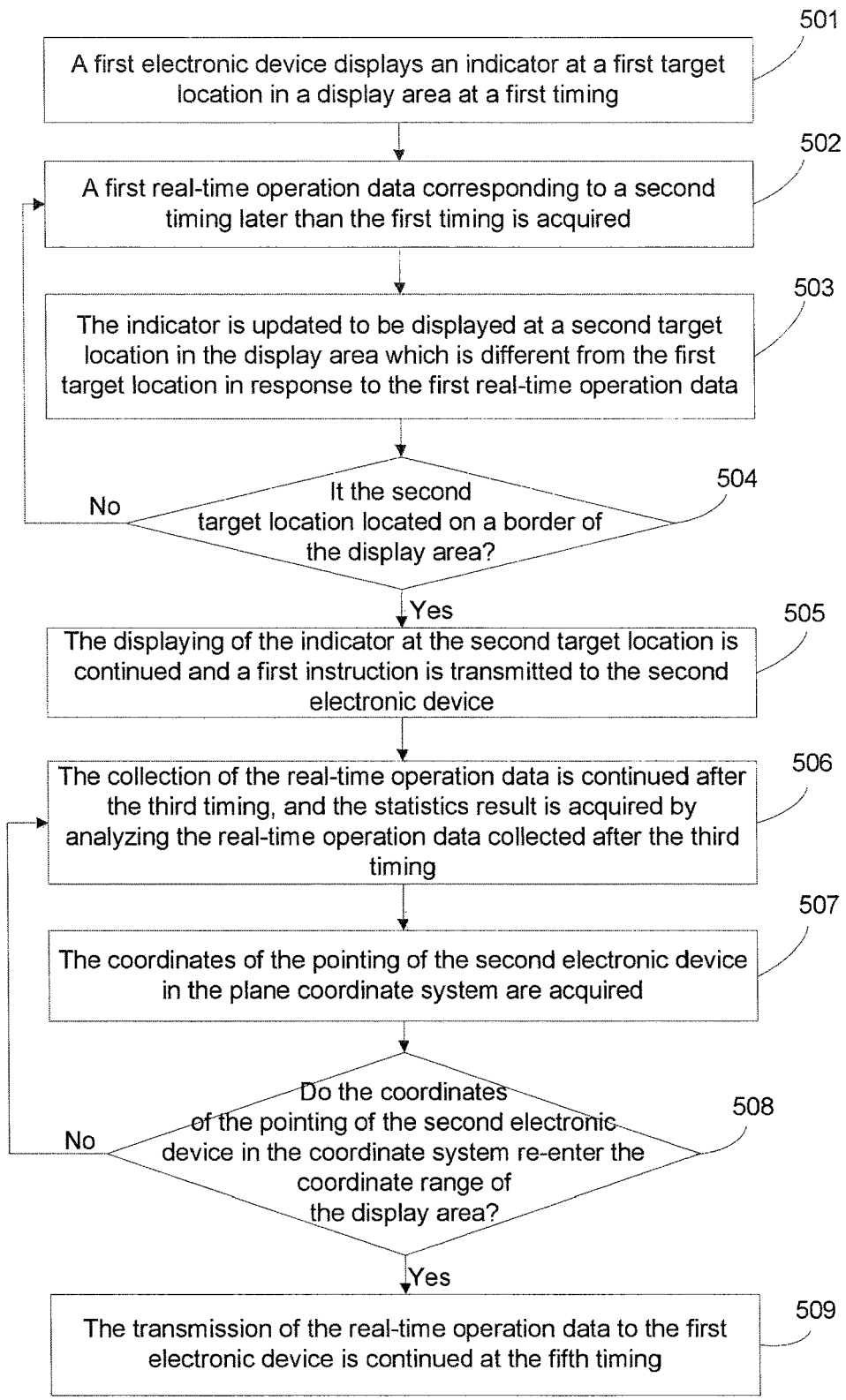
FIG. 5a is a flow chart showing an information processing method according to a fifth embodiment of the present disclosure.

As shown in FIG. 5a, the information processing method of the present embodiment comprises steps as follows.

Step 501: a first electronic device displays an indicator at a first target location on a display area at a first timing.

The first target location matches with a pointing of a second electronic device on the display area of the first electronic device at the first timing.

Step 502: a first real-time operation data corresponding to a second timing which is later than the first timing is acquired.

Real-time operation data corresponding to different timings can be acquired by the first electronic device collecting the location/posture of the second electronic device. For example, the first electronic device may collect data by at least one of:

Image Capture (3D camera or array of cameras), where the location and/or posture of the second electronic device may be determined based on the data collected by analyzing captured images; and Sound Wave Detection, where the location and/or posture of the second electronic device may be determined based on the data collected by analyzing detected sound according to the echolocation principle.

Real-time operation data corresponding to different timings may also be collected and transmitted to the first electronic device by the second electronic device. The second electronic device may use a sensor, such as a gyro, to collect real-time operation data characterizing the location/posture of the second electronic device.

The sample period of the real-time operation data may depend on the requirement on the operation data in terms of real time in actual applications. The higher the requirement of real time is, the shorter the sample period is.

Step 503: the indicator is updated to be displayed at a second target location on the display area different from the first target location, in response to the first real-time operation data.

The second target location may be determined by: analyzing the first real-time operation data to acquire the changed amplitude and direction of the pointing of the second electronic device at the second timing; determining, with reference to the first target location, the coordinates corresponding to the changed amplitude and direction of the pointing of the second electronic device (the second target location) in a plane coordinate system corresponding to the display area. The amplitude here may have a form of distance to characterize the changed distance of the pointing of the second electronic device during each sample period; or the amplitude may have a form of counting to characterize the number of changes of the pointing of the second electronic device with a preset distance step.

When the amplitude has the form of distance, in a plane coordinate system which is established based on the plane in which the display area is located, the second target location may be determined on the display area based on the changed distance and direction of the pointing of the second electronic device at the second timing and based on the first target location, to update and display the indicator at the second target location.

When the amplitude has the form of counting, in a plane coordinate system which is established based on the plane in which the display area is located, the second target location may be determined on the display area based on the changed distance (here, the distance is a product of the count and the preset distance step) and direction of the pointing of the second electronic device at the second timing and based on the first target location, to update and display the indicator at the second target location.

It is to be noted that step 503 may be performed for multiple times before the pointing of the second electronic device goes beyond a border of the display area. In other words, the second target location may be re-determined for multiple times and the indicators may be displayed at the re-determined second target locations for multiple times, to respond to the operations of location control which are performed by the user in the display area by changing the pointing of the second electronic device.

Step 504: it is determined whether the second target location is located on a border of the display area, and if yes, step 505 is performed; otherwise it turns to step 502.

"No" at step 504 characterizes that the pointing of the second electronic device does not go beyond the display area, and it turns to step 503. In response to the operation of changing the pointing of the second electronic device by the user, the indicator is displayed at a location on the display area corresponding to the pointing of the second electronic device (corresponding to the second target location). If the result of step 504 is Yes, which means that the pointing of the second electronic device may go beyond the border of display area after the second timing, step 505 is performed.

Step 505: the indicator is continued to be displayed at the second target location and a first instruction is transmitted to the second electronic device.

The first instruction is used for indicating that the pointing of the second electronic device goes beyond the border of the display area, and instructs the second electronic device to stop transmitting real-time operation data to the first electronic device until it arrives at the fourth timing where the second electronic device continues transmitting the real-time operation data.

The third real-time operation data between the third timing and the fourth timing characterizes a coordinate range of a coordinate re-displaying area for the pointing of the second electronic device in a plane coordinate system corresponding to the display area at the fourth timing.

When the second electronic device receives the first instruction, the following processing may be performed.

Step 506: the real-time operation data is continued to be collected after the third timing, and a statistics result is acquired by analyzing the real-time operation data collected after the third timing.

The statistics result characterizes the changed amplitude and direction of the pointing of the second electronic device on a first coordinate axis (the first coordinate axis is a coordinate axis in the plane coordinate system established based on the plane in which the display area is located) after the third timing. The amplitude here may be characterized by the distance of the movement of the pointing of the second electronic device; or the amplitude may be characterized by the number of changes of the pointing of the second electronic device (representing the number of changes of the pointing of the second electronic device with a preset distance step).

The statistics result further characterizes the changed amplitude and direction of the pointing of the second electronic device on a second coordinate axis (the second coordinate axis is a coordinate axis in the plane coordinate system established based on the plane in which the display area is located) after the third timing. The amplitude here may be characterized by the distance of the movement of the pointing of the second electronic device; or the amplitude may be characterized by the number of changes of the pointing of the second electronic device (representing the number of changes of the pointing of the second electronic device with a preset distance steps).

Step 507: with reference to the second target location, based on the changed amplitude and direction characterized by the statistics result, the coordinates of the second target location are adjusted in the plane coordinate system corresponding to the display area, to acquire coordinates of the pointing of the second electronic device in the plane coordinate system.

Step 508: Whether the coordinates of the pointing of the second electronic device in the plane coordinate system re-enters the coordinate range of the display area. If yes, then step 509 is performed; otherwise, it turns to step 506.

Step 509: Real-time operation data is continued to be transmitted to the first electronic device from the fifth timing.

Figure 5B:
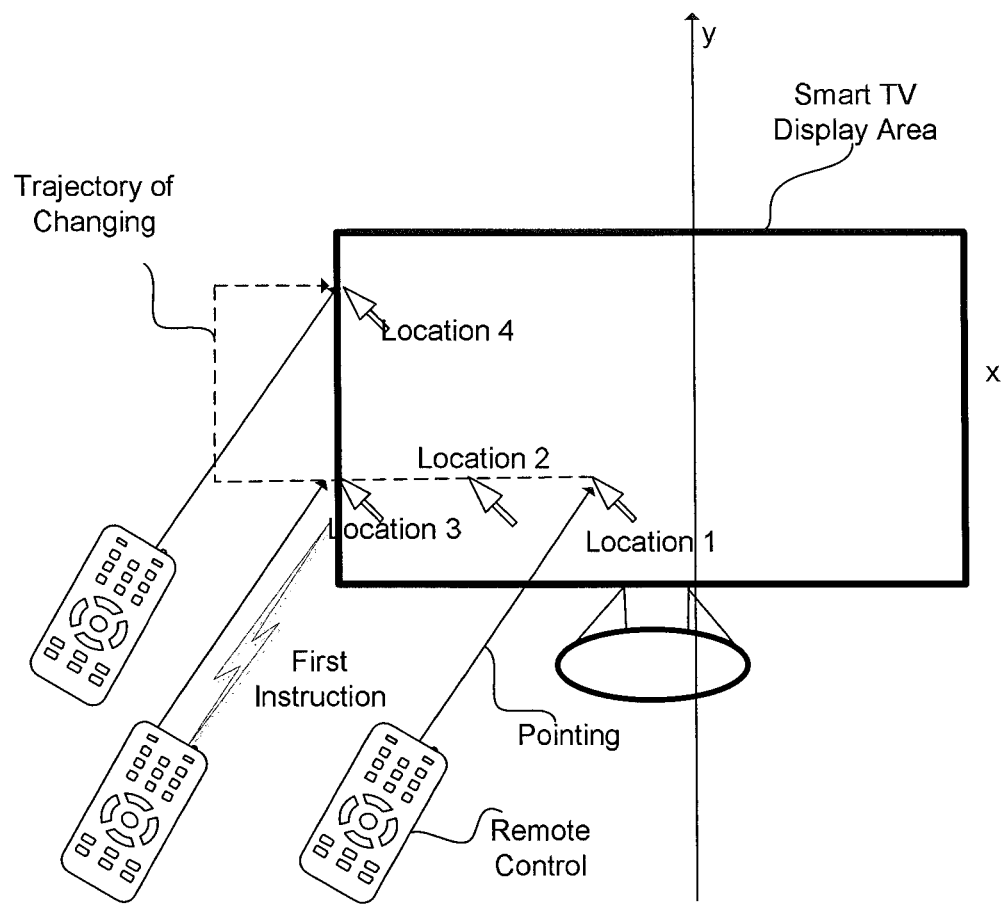
FIG. 5b is a scenario diagram showing the information processing method according to the fifth embodiment of the present disclosure.

One example is shown in FIG. 5b. At the first timing, the first electronic device displays the indicator at Location 1 (corresponding to the first target location). The first electronic device receives the first real-time operation data, corresponding to the second timing, transmitted by the second electronic device. By the above step 503, the coordinates of the pointing of the second electronic device in the plane coordinate system at the second timing are determined, and the indicator is displayed at Location 2 (corresponding to the second target location) on the display area based on the determined coordinates. At the next second timing, the above process is repeated. If it is determined that the pointing of the second electronic device goes beyond the border of the display area at Location 3 (the second target location corresponding to the next second timing), then the indicator is continued to be displayed at Location 3, and a first instruction is transmitted to the second electronic device to instruct the second electronic device to continue transmitting real-time operation data before the fourth timing is reached (the process of the second electronic device determining the fourth timing is same as above). The first electronic device analyzes to acquire a statistics result (comprising the changed amplitude and direction of the pointing of the second electronic device on the X axis and Y axis) based on the real-time operation data, corresponding to the fourth timing, transmitted by the second electronic device. The coordinates of Location 4 corresponding to the changed amplitude and direction are determined in the plane coordinate system with reference to Location 3, and the indicator is displayed at Location 4 based on the determined coordinates.

Sixth Embodiment

The present embodiment provides an information processing method in a second electronic device. The second electronic device supports a collaborative operation with a first electronic device. In practical, the first electronic device may be a television, a projector, or any other display device. The first electronic device supports displaying of an indicator (for example, a conventional arrow) at a location within its own display area, the location matching with a pointing of a second electronic device on the display area, to indicate a location on the display area that can be operated by means of the pointing of the second electronic device (which may be a remote control or a smart phone) on the display area (hereinafter, referred as "the pointing"). In this way, the user is enabled to use the second electronic device to control the first electronic device for achieving web browsing, multimedia file playback, gaming, or the like.

Figure 6:
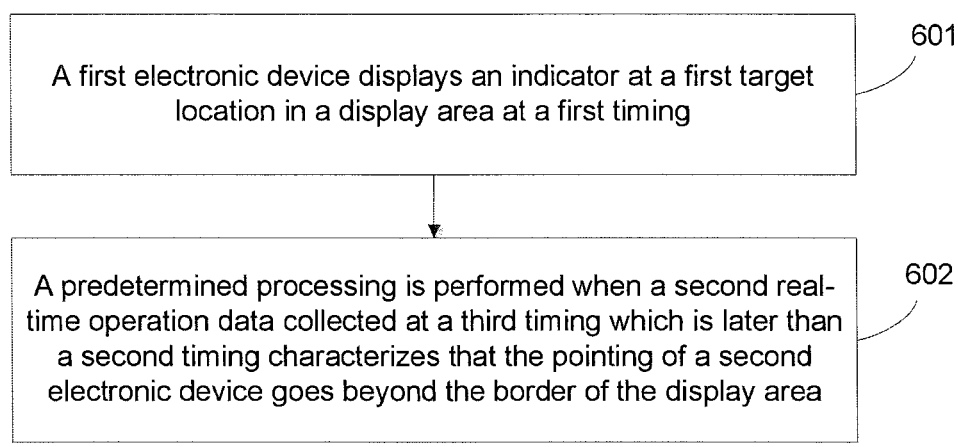
FIG. 6 is a flow chart showing an information processing method according to a sixth embodiment of the present disclosure.

As shown in FIG. 6, the information processing method of the present embodiment comprises steps as follows.

Step 601: a first real-time operation data corresponding to a second timing which is later than a first timing is collected.

Real-time operation data corresponding to different timings can be acquired by the first electronic device collecting the location/posture of the second electronic device. For example, the first electronic device may collect data by at least one of:

Image Capture (3D camera or array of cameras), where the location and/or posture of the second electronic device may be determined based on the data collected by analyzing captured images; and Sound Wave Detection, where the location and/or posture of the second electronic device may be determined based on the data collected by analyzing detected sound according to the echolocation principle.

Real-time operation data corresponding to different timings may also be collected and transmitted to the first electronic device by the second electronic device. The second electronic device may use a sensor, such as a gyro, to collect real-time operation data characterizing the location/posture of the second electronic device.

The sample period of the real-time operation data may depend on the requirement on the operation data in terms of real time in actual applications. The higher the requirement of real time is, the shorter the sample period is.

Step 602: a predetermined processing is performed when a second real-time operation data collected at a third timing which is later than the second timing characterizes that the pointing of the second electronic device goes beyond a border of the display area.

The predetermined processing is used to cause the first electronic device to display the indicator at a third target location on the display area at a fourth timing when the pointing of the second electronic device is located on the display area again, the third target location matching with the pointing of the second electronic device.

The performing of the predetermined processing comprises two cases as follows.

1) When the pointing of the second electronic device goes beyond the display area at the second target location of the display area, the transmission of the real-time operation data is aborted after the third timing until the fourth timing (that is the timing when the pointing of the second electronic device re-enters the display area). The fifth real-time operation data corresponding to the fourth timing is transmitted, and the first electronic device analyzes the fifth real-time operation data to acquire the changed amplitude and direction of the pointing of the second electronic device. Based on the changed amplitude and direction (comprising the changed amplitude and direction on the X axis, and/or the changed amplitude and direction on the Y axis), in a plane coordinate system corresponding to the display area, with reference to the coordinates of the second target location, the coordinates of a third target location corresponding to the changed amplitude and direction are determined. The indicator is displayed at the third target location on the display area based on the determined coordinates.

2) When the pointing of the second electronic device goes beyond the display area at the second target location of the display area, the transmission of the real-time operation data is continued after the third timing, and it is indicated that the pointing of the second electronic device has gone beyond a border of the display area. The second electronic device analyzes the real-time operation data received after the third timing to acquire the changed amplitude and direction of the pointing of the second electronic device since the second timing, and the coordinates of the location of the pointing of the second electronic device in a plane coordinate system (the plane coordinate system being established based on the display area) are determined. When the coordinates of the locations of the pointing of the second electronic device in the plane coordinate system are located within the coordinate range of the display area again, which means that the pointing of the second electronic device re-enters the border of the display area, i.e., it arrives at the fourth timing, the fifth real-time operation data corresponding to the fourth timing is transmitted to the first electronic device, and the first electronic device analyzes the fifth real-time operation data to acquire the changed amplitude and direction of the pointing of the second electronic device. Based on the changed amplitude and direction (comprising the changed amplitude and direction on the X axis, and/or the changed amplitude and direction on the Y axis), in the plane coordinate system corresponding to the display area, with reference to the coordinates of the second target location, the coordinates of a third target location corresponding to the changed amplitude and direction. The indicator is displayed at the third target location on the display area based on the determined coordinates.

Seventh Embodiment

Figure 7:
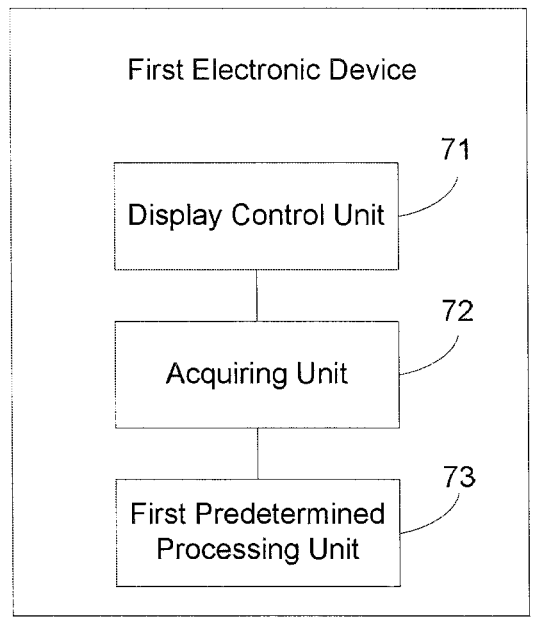
FIG. 7 is a structural diagram of a first electronic device according to a seventh embodiment of the present disclosure.

The present embodiment provides a first electronic device as shown in FIG. 7. The first electronic device comprises:

a display control unit 71 configured to display an indicator at a first target location on a display area of the first electronic device at a first timing, the first target location matching with a pointing of a second electronic device on the display area of the first electronic device;

an acquiring unit 72 configured to acquire a first real-time operation data corresponding to a second timing which is later than the first timing;

the display control unit 71 is further configured to update to display the indicator at a second target location on the display area different from the first target location in response to the first real-time operation data, the second target location matching with the pointing, wherein the first real-time operation data corresponding to the second timing characterizes an change of the pointing which does not go beyond a border of the display area;

the acquiring unit 72 is further configured to acquire a second real-time operation data corresponding to a third timing which is later than the second timing when the second target location is located on a border of the display area, wherein the second real-time operation data corresponding to the third timing characterizes an change of the pointing which goes beyond the border of the display area; and a first predetermined processing unit 73 configured to perform a predetermined process such that the indicator is displayed at a third target location on the display area at a fourth timing when the pointing re-enters the display area which is later than the third timing, the third target location matching with the pointing, and the third target location being same as or different from the second target location.

As an implementation, the display control unit 71 is further configured to analyze the first real-time operation data to determine the changed amplitude and direction of the pointing at the second timing; and to determine, with reference to the first target location, the second target location on the display area corresponding to the amplitude and direction, and update to display the indicator at the second target location.

As an implementation, the first predetermined processing unit 73 comprises:

an analyzing module configured to analyze a third real-time operation data between the third timing and the fourth timing to acquire a first statistics result and a second statistics result, wherein the first statistics result characterizes the changed amplitude and direction of the pointing on a first coordinate axis in the coordinate system corresponding to the display area, and the second statistics result characterizes the changed amplitude and direction of the pointing on a second coordinate axis in the coordinate system corresponding to the display area;

a first determining module (coupled to the analyzing module) configured to determine the coordinates of the third target location in the coordinate system corresponding to the display area based on the changed amplitude and direction characterized by the first statistics result and the second statistics result with reference to the second target location; and a first displaying module (coupled to the first determining module) configured to update to display the indicator on the display area based on the determined coordinates when the determined coordinates are located in the coordinate range corresponding to the display area.

As an implementation, the acquiring unit 72 is further configured to acquire a third real-time operation data at a fifth timing which is later than the third timing and earlier than the fourth timing.

As an implementation, the first electronic device further comprises (not shown): a statistics unit 75 (coupled to the first predetermined processing unit 74) configured to determine a third statistics result based on the third real-time operation data, the third statistics result characterizing the changed amplitude and direction of the pointing on the first coordinate axis in the coordinate system and/or the changed amplitude and direction of the pointing on the second coordinate axis in the coordinate system.

The display control unit 71 is further configured to determine a fourth target location on a border of the display area based on the changed amplitude and direction of the pointing on the coordinate axes in the coordinate system, to update displaying of the indicator, until it is determined based on the third statistics result that the coordinates of the location of the pointing on the first coordinate axis in the coordinate system goes beyond the coordinate range of the display area on the first coordinate axis and that the coordinates of the location of the pointing on the second coordinate axis in the coordinate system goes beyond the coordinate range of the display area on the second coordinate axis, and updating of the displaying of the indicator at the fourth target location is aborted.

As an implementation, the first predetermined processing unit comprises (not shown): a second determining module configured to abort the displaying of the indicator on the display area after the third timing, and determine the amplitude and direction of the movement of the pointing based on the fourth real-time operation data acquired at a sixth timing which is later than the third timing but earlier than the fourth timing; and a second displaying module (coupled to the second determining module) configured to determine a fifth target location in a virtual display area based on the changed amplitude and direction of the pointing, to update to display the indicator at the fifth target location, the virtual display area being used for collaborative display with the display area until the fifth real-time operation data acquired at the fourth timing characterizes that the pointing enters the display area from the virtual display area, and to determine, based on the changed amplitude and direction of the pointing characterized by the fourth statistics result corresponding to the fifth real-time operation data, the third target location on the display area to display the indicator at the third target location.

As an implementation, the first predetermined processing unit 73 comprises (not shown): a first instruction unit configured to transmit a first instruction to the second electronic device to indicate that the pointing goes beyond a border of the display area; and a second instruction unit (coupled to the first instruction unit) configured to instruct the second electronic device to abort the transmission of the real-time operation data to the first electronic device until it arrives at the four timing where the second electronic device continues transmitting the real-time operation data wherein the third real-time operation data between the third timing and the fourth timing characterizes that the coordinates of the pointing in the coordinate system corresponding to the display area re-enters the coordinate range of the display area at the fourth timing.

In practical, various units of the first electronic device may be implemented by a micro-processor (MCU) or a Field Programmable Gate Array (FPGA).

Eighth Embodiment

Figure 8:
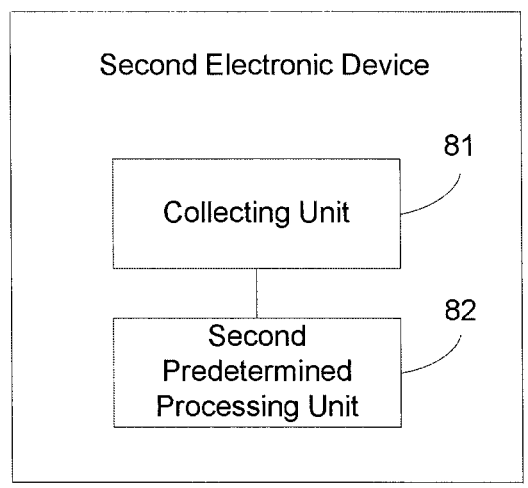
FIG. 8 is a structural diagram of a second electronic device according to an eighth embodiment of the present disclosure.

The present embodiment provides a second electronic device as shown in FIG. 8. The second electronic device comprises:

a collecting unit 81 configured to collect a first real-time operation data corresponding to a second timing which is later than a first timing, the first real-time operation data being used to characterize a pointing of the second electronic device on a display area of a first electronic device at the second timing, the first real-time operation data being used for the first electronic device to update to display an indicator at a second target location on the display area, to replace the displaying of the indicator at a first target location, the first target location matching with the pointing at the first timing;

a second predetermined processing unit 82 configured to perform a predetermined process when a second real-time operation data collected at a third timing which is later than the second timing characterizes that the pointing goes beyond a border of the display area, such that the first electronic device displays the indicator at a third target location on the display area at a fourth timing when the pointing is located on the display area again, the third target location matching with the pointing.

In practical, the collecting unit 81 may be implemented by a sensor in the second electronic device, such as a gyro, and the second predetermined processing unit 82 may be implemented by a micro-processor (MCU) or a Field Programmable Gate Array (FPGA).

The above descriptions are merely specific implementations of the present disclosure, and the scope of the present disclosure is not limited thereto. Without departing from the scope of the present disclosure, one skilled in the art could easily contemplate changes or substitutions which are embraced by the scope of the present disclosure. Therefore, the scope of the present disclosure should be defined by the following claims.

We claim:

1. An information processing method, comprising:
    displaying an indicator at a first location on a display area of a first electronic device at a first timing, the first location matching with a pointing of a second electronic device on the display area of the first electronic device;
    acquiring a first operation data corresponding to a second timing which is later than the first timing, and updating to display the indicator at a second location on the display area different from the first location in response to the first operation data, the second location matching with the pointing at the second timing;
    when the second location is located on a border of the display area, acquiring a second operation data corresponding to a third timing which is later than the second timing, wherein the second operation data corresponding to the third timing characterizes an change of the pointing which goes beyond the border of the display area; and
    performing a predetermined process such that the indicator is displayed at a third location on the display area when the pointing re-enters the display area at a fourth timing which is later than the third timing, the third location matching with the pointing at the fourth timing, wherein the step of performing a predetermined process comprises:
    displaying the indicator at a location on the border of the display area where the pointing goes beyond the border of the display area;
    analyzing a third operation data between the third timing and the fourth timing to acquire a first statistics result and a second statistics result, wherein the first statistics result characterizes the changed amplitude and direction of the pointing on a first coordinate axis in a coordinate system corresponding to the display area, and wherein the second statistics result characterizes the changed amplitude and direction of the pointing on a second coordinate axis in the coordinate system corresponding to the display area;

determining the coordinates of the third location in the coordinate system corresponding to the display area based on the changed amplitude and direction characterized by the first statistics result and the second statistics result with reference to the second location; and updating to display the indicator on the display area based on the determined coordinates if the determined coordinates are located in a coordinate range corresponding to the display area, or, wherein the step of performing a predetermined process comprises:

transmitting a first instruction to the second electronic device to indicate that the pointing goes beyond the border of the display area, and instruct the second electronic device to abort transmission of operation data which is achieved via wireless to the first electronic device until the arrival of the fourth timing where the second electronic device continues wireless transmission of the operation data, wherein the third operation data between the third timing and the fourth timing characterizes that coordinates of the pointing in a coordinate system corresponding to the display area re-enters the coordinate range of the display area at the fourth timing.

2. The information processing method according to claim 1, wherein the step of updating to display the indicator at a second location on the display area different from the first location in response to the first operation data comprises:

analyzing the first operation data to determine the changed amplitude and direction of the pointing at the second timing; and determining the second location on the display area corresponding to the amplitude and direction with reference to the first location, and updating to display the indicator at the second location.

3. The information processing method according to claim 1, further comprising:

acquiring the third operation data at a fifth timing which is later than the third timing but earlier than the fourth timing, determining a third statistics result based on the third operation data, the third statistics result characterizing the changed amplitude and direction of the pointing on the first coordinate axis in the coordinate system and/or the changed amplitude and direction of the pointing on the second coordinate axis in the coordinate system;

determining a fourth location on the border of the display area based on changed amplitude and direction of the pointing on the coordinate axes in the coordinate system for updating the displaying of the indicator, and aborting updating of the displaying of the indicator at the fourth location if it is determined, based on the third statistics result, that the coordinate of the location of the pointing on the first coordinate axis in the coordinate system goes beyond the coordinate range of the display area on the first coordinate axis and that the coordinate of the location of the pointing on the second coordinate axis in the coordinate system goes beyond the coordinate range of the display area on the second coordinate axis.

4. The information processing method according to claim 1, wherein the step of performing a predetermined process comprises:

aborting the displaying of the indicator on the display area after the third timing, and determining the amplitude and direction of the movement of the pointing based on a fourth operation data acquired at a sixth timing which is later than the third timing but earlier than the fourth timing;

determining a fifth location in a virtual display area based on the changed amplitude and direction of the pointing, to update to display the indicator at the fifth location, the virtual display area being used for displaying collaboratively with the display area; and if a fifth operation data acquired at the fourth timing characterizes that the pointing enters the display area from the virtual display area, determining the third location on the display area based on the changed amplitude and direction of the pointing characterized by a fourth statistics result corresponding to the fifth operation data, to display the indicator at the third location.

5. An information processing method in a second electronic device, the method comprising:

collecting a first operation data corresponding to a second timing which is later than a first timing and transmitting the first operation data to a first electronic device, the first operation data being used to characterize a pointing of the second electronic device on a display area of the first electronic device at the second timing, the first operation data being used for the first electronic device to update to display an indicator at a second location on the display area, to replace the displaying of the indicator at a first location, the first location matching with the pointing at the first timing;

performing a predetermined process if a second operation data collected at a third timing which is later than the second timing characterizes that the pointing goes beyond the border of the display area, such that the first electronic device displays the indicator at a third location on the display area when the pointing re-enters the display area at a fourth timing which is later than the third timing, the third location matching with the pointing at the fourth timing, wherein performing the predetermined process further comprises:

aborting transmission of operation data which is achieved via wireless communication to the first electronic device since the third timing until arriving at the fourth timing; and transmitting, via wireless communication, fifth operation data corresponding to the fourth timing to the first electronic device.

6. The information processing method according to claim 5, wherein performing the predetermined process further comprises:

indicating to the first electronic device that the pointing has gone beyond a border of the display area at the third timing;

analyzing the operation data collected after the third timing to acquire the changed amplitude and direction of the pointing; and transmitting fifth operation data corresponding to the fourth timing to the first electronic device when the pointing re-enters the border of the display area.

7. A first electronic device, comprising:

a display control unit configured to display an indicator at a first location on a display area of the first electronic device at a first timing, the first location matching with a pointing of a second electronic device on the display area of the first electronic device;
an acquiring unit configured to acquire a first operation data corresponding to a second timing which is later than the first timing;
the display control unit being further configured to update to display the indicator at a second location on the display area different from the first location in response to the first operation data, the second location matching with the pointing at the second timing;
the acquiring unit being further configured to acquire a second operation data corresponding to a third timing which is later than the second timing when the second location is located on a border of the display area, wherein the second operation data corresponding to the third timing characterizes an change of the pointing which goes beyond the border of the display area; and
a first predetermined processing unit configured to perform a predetermined process such that the indicator is displayed at a third location on the display area when the pointing re-enters the display area at a fourth timing which is later than the third timing, the third location matching with the pointing at the fourth timing,
wherein the first predetermined processing unit comprises:
an analyzing module configured to analyze a third operation data between the third timing and the fourth timing to acquire a first statistics result and a second statistics result, wherein the first statistics result characterizes the changed amplitude and direction of the pointing on a first coordinate axis in a coordinate system corresponding to the display area, and the second statistics result characterizes the changed amplitude and direction of the pointing on a second coordinate axis in the coordinate system corresponding to the display area;
a first determining module configured to determine the coordinates of the third location in the coordinate system corresponding to the display area based on the changed amplitude and direction characterized by the first statistics result and the second statistics result with reference to the second location; and
a first displaying module configured to display the indicator at a location on the border of the display area where the indicator goes beyond the border of the display area, and to update to display the indicator on the display area based on the determined coordinates when the determined coordinates are located in a coordinate range corresponding to the display area, or,
wherein the first predetermined processing unit comprises:
a first instruction unit configured to transmit a first instruction to the second electronic device to indicate that the pointing goes beyond the border of the display area, and
a second instruction unit configured to instruct the second electronic device to abort transmission of operation data to the first electronic device until arrival of the fourth timing where the second electronic device continues wireless transmission of the operation data,
wherein the third operation data between the third timing and the fourth timing characterizes that coordinates of the pointing in a coordinate system corresponding to the display area re-enters the coordinate range of the display area at the fourth timing.

8. The first electronic device according to claim 7, wherein the display control unit is further configured to
analyze the first operation data to determine the changed amplitude and direction of the pointing at the second timing; and
determine the second location on the display area corresponding to the amplitude and direction with reference to the first location, and update to display the indicator at the second location.

9. The first electronic device according to claim 7, wherein
the acquiring unit is further configured to acquire the third operation data at a fifth timing which is later than the third timing but earlier than the fourth timing;
the first electronic device further comprises:
a statistics unit configured to determine a third statistics result based on the third operation data, the third statistics result characterizing the changed amplitude and direction of the pointing on the first coordinate axis in the coordinate system and/or the changed amplitude and direction of the pointing on the second coordinate axis in the coordinate system;
the display control unit is further configured to determine a fourth location on the border of the display area based on the changed amplitude and direction of the pointing on the coordinate axes in the coordinate system, for updating the displaying of the indicator, and to abort updating of the displaying of the indicator at the fourth location if it determined, based on the third statistics result, that the coordinate of the location of the pointing on the first coordinate axis in the coordinate system goes beyond the coordinate range of the display area on the first coordinate axis and that the coordinate of the location of the pointing on the second coordinate axis in the coordinate system goes beyond the coordinate range of the display area on the second coordinate axis.

10. The first electronic device according to claim 7, wherein the first predetermined processing unit further comprises:
a second displaying module configured to determine a fifth location in a virtual display area based on the changed amplitude and direction of the pointing to update to display the indicator at the fifth location, the virtual display area being used for displaying collaboratively with the display area, and to determine the third location on the display area based on the changed amplitude and direction of the pointing characterized by a fourth statistics result corresponding to a fifth operation data acquired at the fourth timing to display the indicator at the third location if the fifth operation data characterizes that the pointing enters the display area from the virtual display area.

11. A second electronic device, comprising:
a collecting unit configured to collect a first operation data corresponding to a second timing which is later than a first timing, the first operation data being used to characterize a pointing of the second electronic device on a display area of a first electronic device at the second timing, the first operation data being transmitted to the first electronic device and used for the first electronic device to update to display an indicator at a second location on the display area, to replace the displaying of the indicator at a first location, the first location matching with the pointing at the first timing;
a second predetermined processing unit configured to perform a predetermined process when a second operation data collected at a third timing which is later than the second timing characterizes that the pointing goes beyond a border of the display area, such that the first electronic device displays the indicator at a third location on the display area when the pointing re-enters the display area at a fourth timing which is later than the third timing, the third location matching with the pointing at the fourth timing, wherein the second predetermined processing unit is further configured to abort transmission of operation data which is achieved via wireless communication to the first electronic device since the third timing until arriving at the fourth timing, and transmit fifth operation data which is also achieved via wireless communication corresponding to the fourth timing to the first electronic device.

* * * * *